United States Patent
Mortel et al.

(10) Patent No.: US 8,576,663 B2
(45) Date of Patent: Nov. 5, 2013

(54) MULTICOMPONENT SEISMIC INVERSION OF VSP DATA

(75) Inventors: Jan van de Mortel, Rogaland (NO); Jacob Thymann Nielsen, Houston, TX (US); Maria Gabriela D'Aubeterre Reyes, Aberdeen (GB); Andrew Ronald Ross, Copenhagen Ø (DK)

(73) Assignee: Schlumberger Technology Corporation, Sugar Land, TX (US)

( * ) Notice: Subject to any disclaimer, the term of this patent is extended or adjusted under 35 U.S.C. 154(b) by 647 days.

(21) Appl. No.: 12/770,829

(22) Filed: Apr. 30, 2010

(65) Prior Publication Data

US 2011/0267921 A1    Nov. 3, 2011

(51) Int. Cl.
*G01V 1/00* (2006.01)
(52) U.S. Cl.
USPC .......................................................... 367/57
(58) Field of Classification Search
USPC .......... 367/25, 56, 57, 73; 703/10; 702/11, 14
See application file for complete search history.

(56) References Cited

U.S. PATENT DOCUMENTS

| | | | |
|---|---|---|---|
| 6,058,073 A | 5/2000 | VerWest | |
| 6,894,949 B2* | 5/2005 | Aronstam | 367/57 |
| 7,575,818 B2* | 8/2009 | Park et al. | 428/690 |
| 7,911,878 B2* | 3/2011 | Zhao et al. | 367/57 |
| 2004/0093163 A1 | 5/2004 | Reshef et al. | |
| 2009/0157367 A1* | 6/2009 | Meyer et al. | 703/10 |

FOREIGN PATENT DOCUMENTS

EP        0347019 A2    12/1989

* cited by examiner

*Primary Examiner* — Mark Hellner
(74) *Attorney, Agent, or Firm* — Colin Wier; Rodney Warfford

(57) ABSTRACT

A method for seismic inversion of vertical seismic profile (VSP) data in an oilfield. The method includes obtaining an initial velocity model of a subterranean formation including acoustic velocities of wave propagation in proximity to the wellbore, determining an acquisition geometry for obtaining the VSP data including receiver locations within the wellbore and a source location, performing a seismic survey to obtain the VSP data based on the acquisition geometry, analyzing arrival signals of the VSP data to generate transit time data for wave propagation from the source location to the receiver locations, modifying the initial velocity model to generate an updated velocity model by performing a tomographic inversion of the transit time data, generating an elastic model of the subterranean formation by performing the seismic inversion of the VSP data using the updated velocity model, and adjusting the operations of the oilfield based on the elastic model.

20 Claims, 14 Drawing Sheets

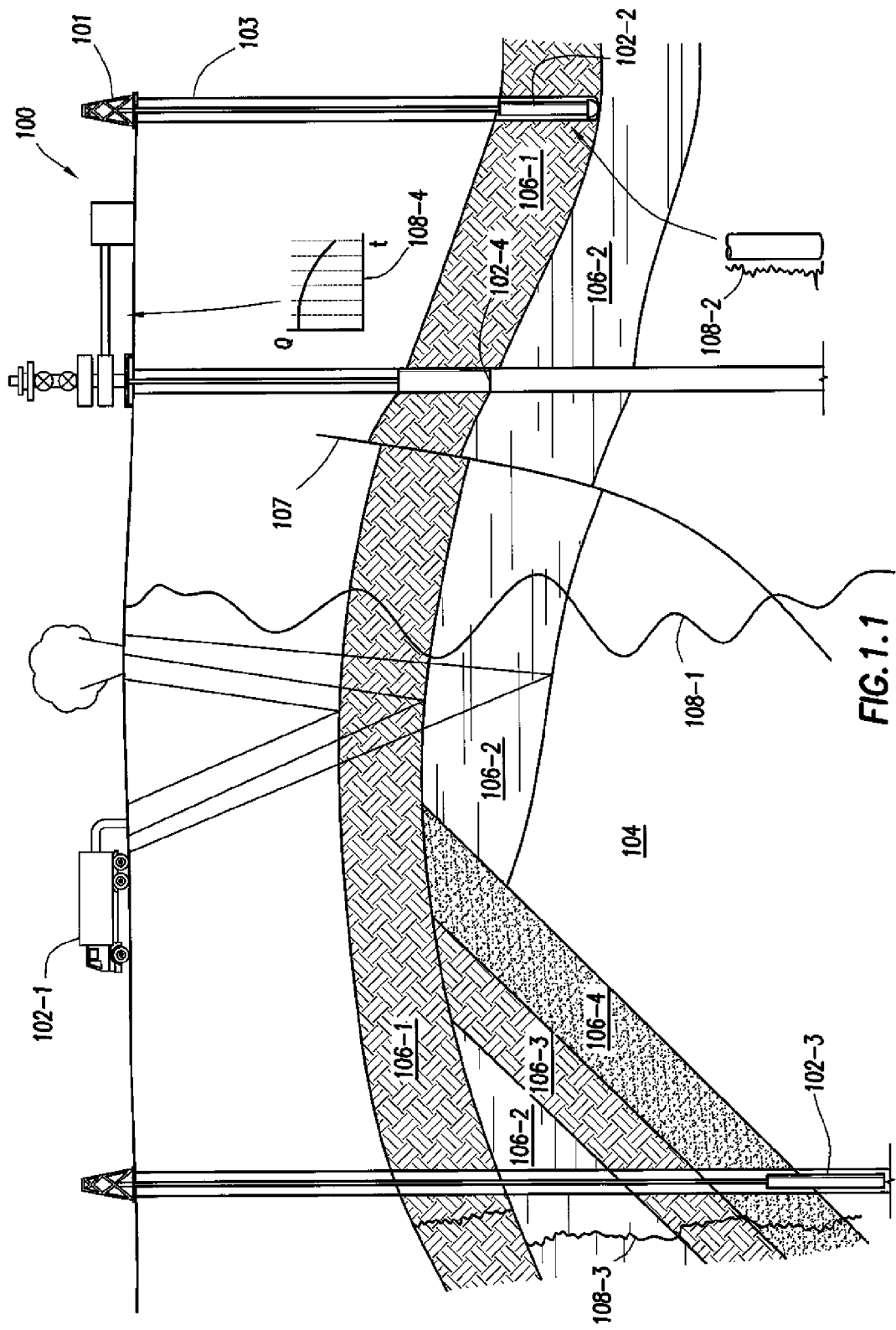
FIG.1.1

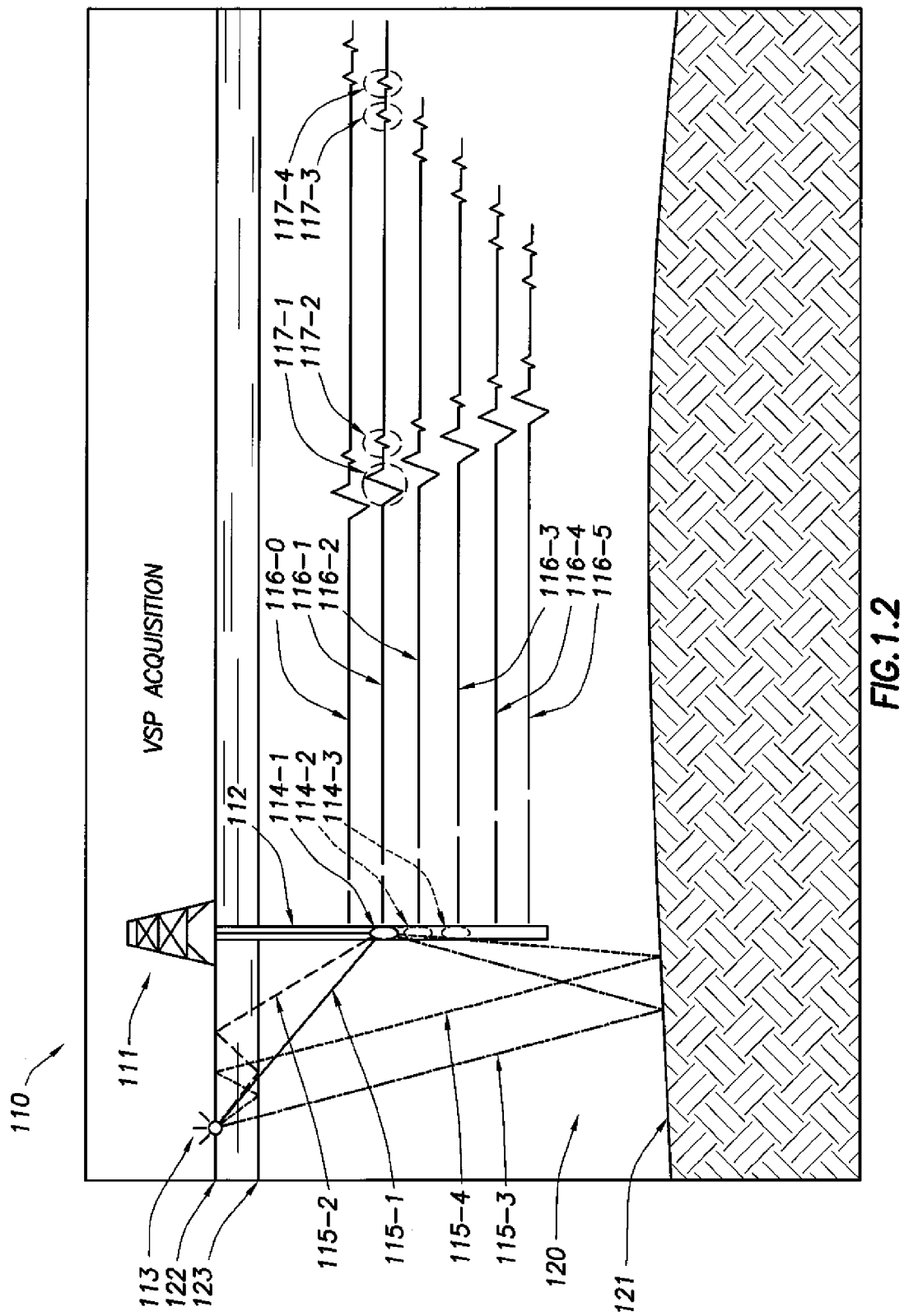
FIG. 1.2

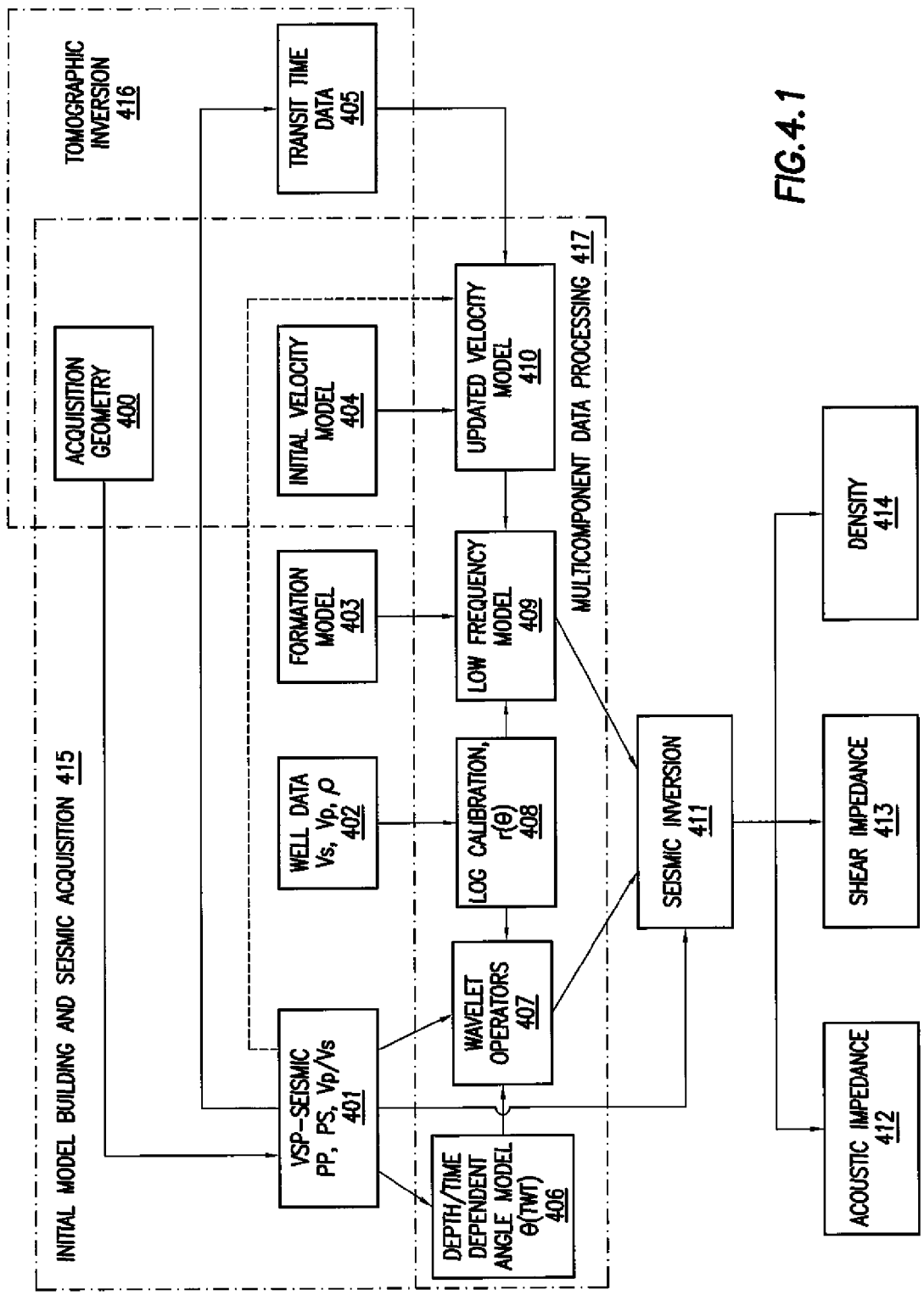
FIG.4.1

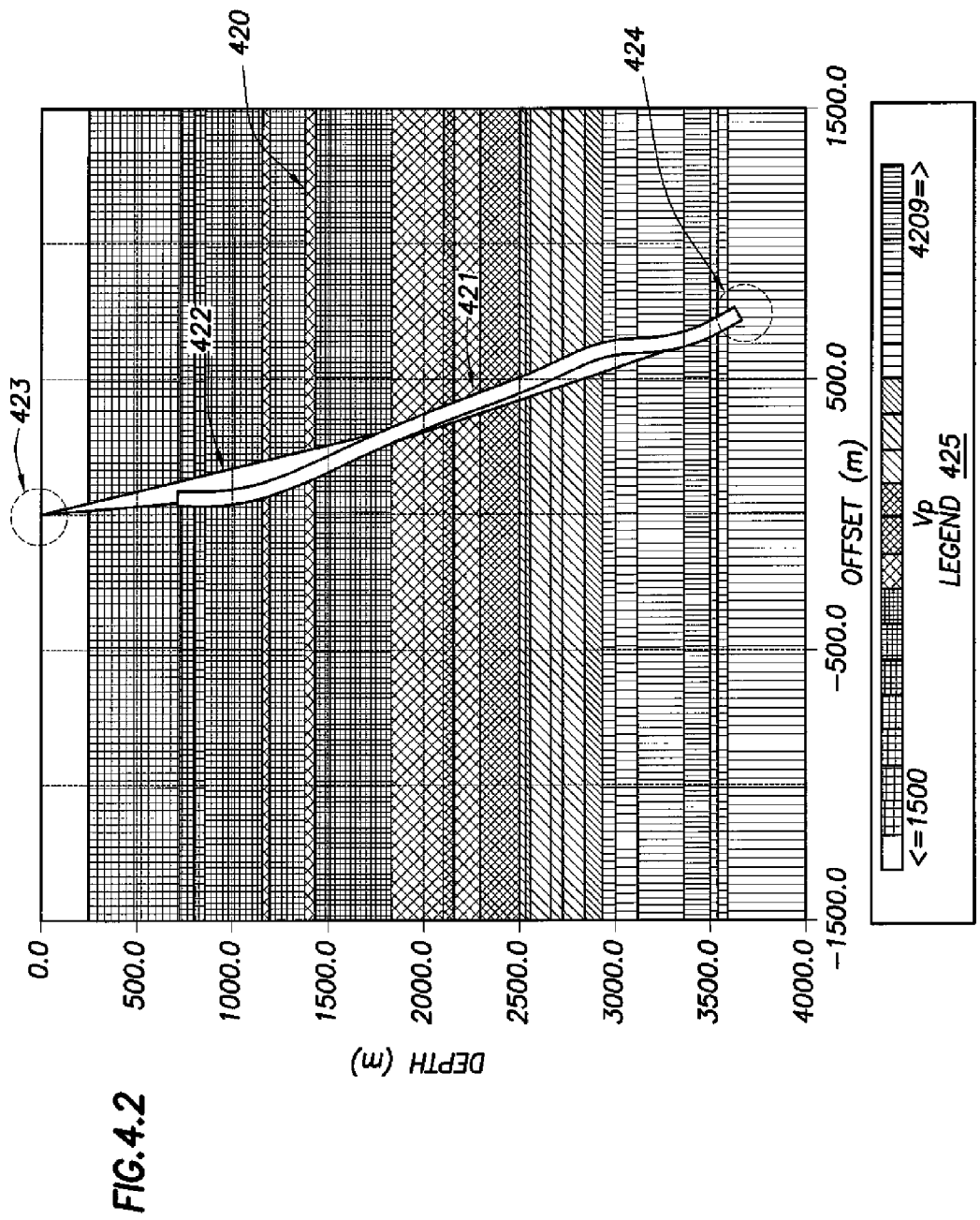
FIG. 4.2

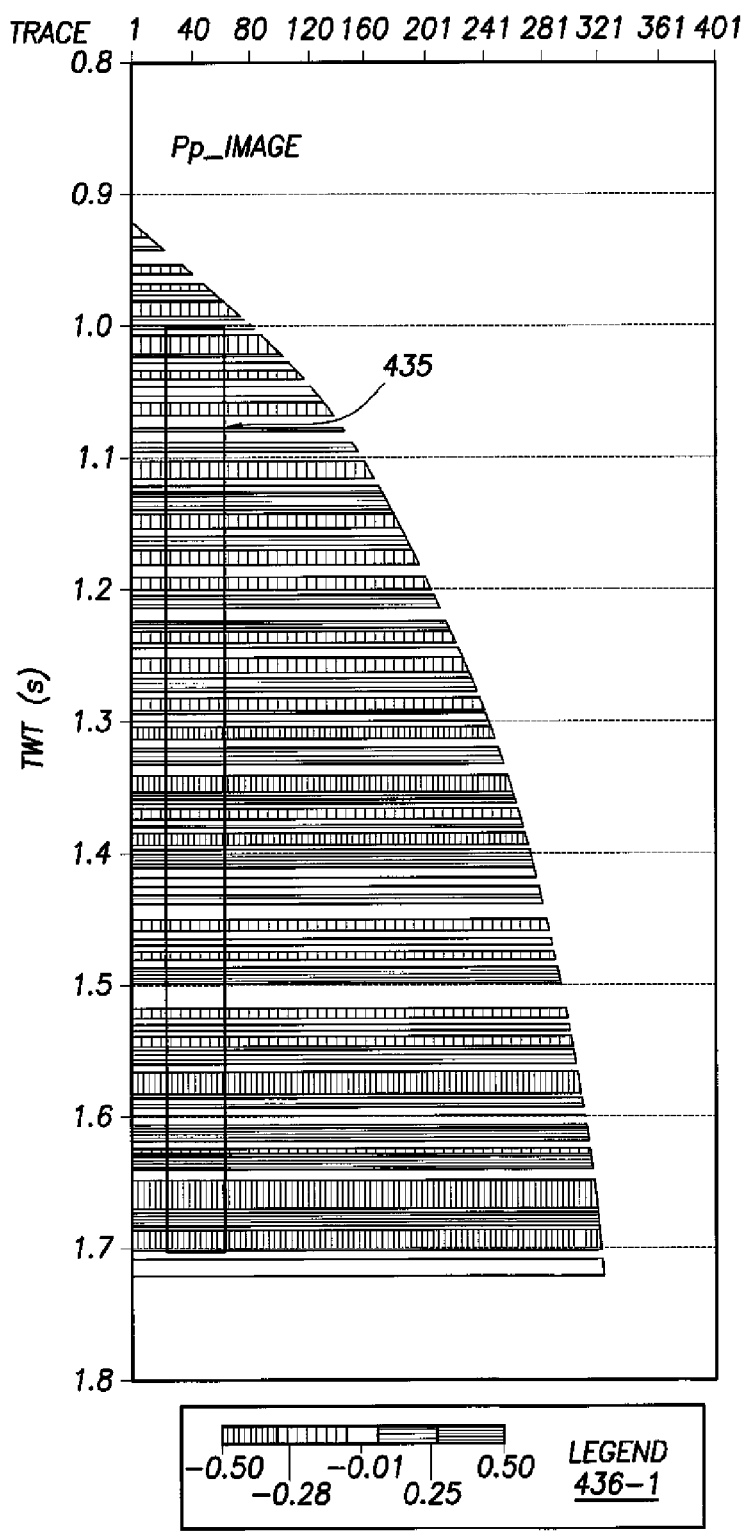
FIG.4.3.1

FIG.4.3.2
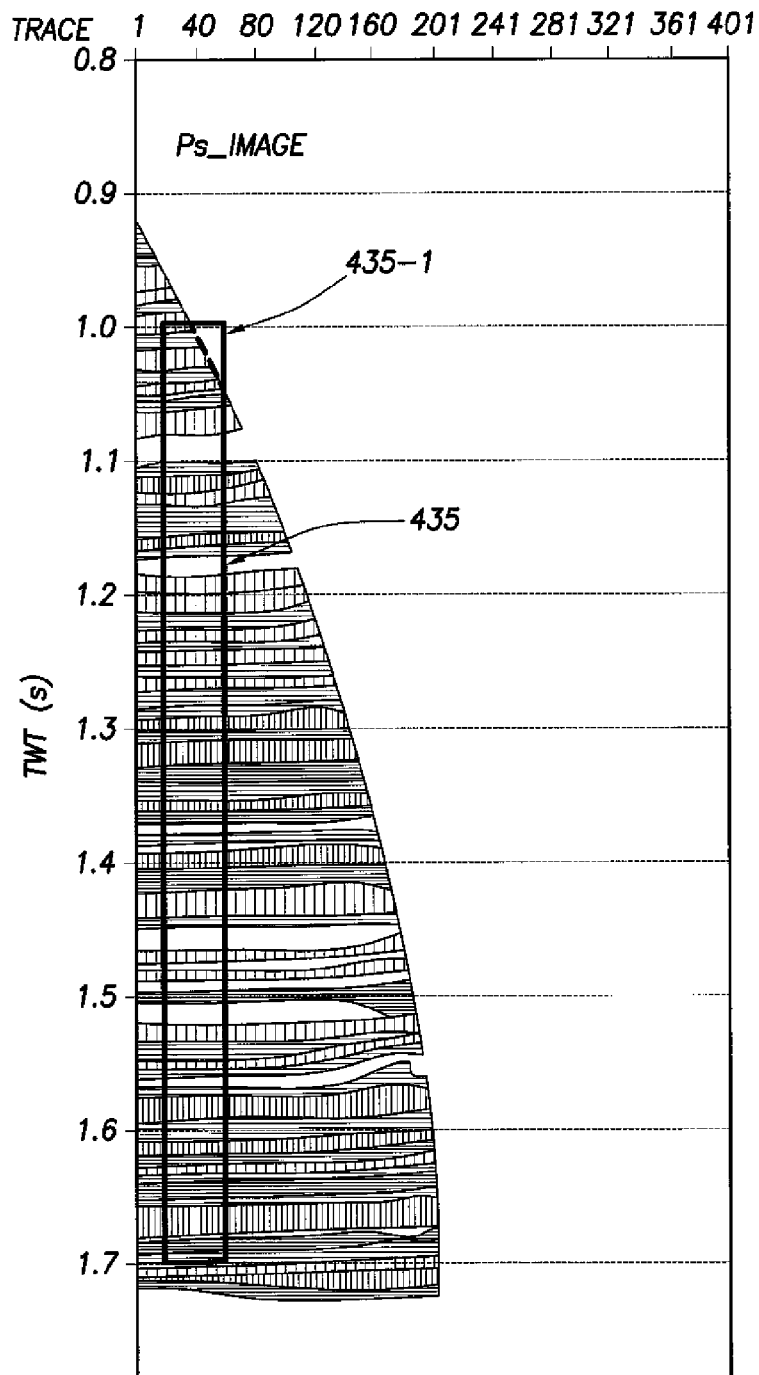

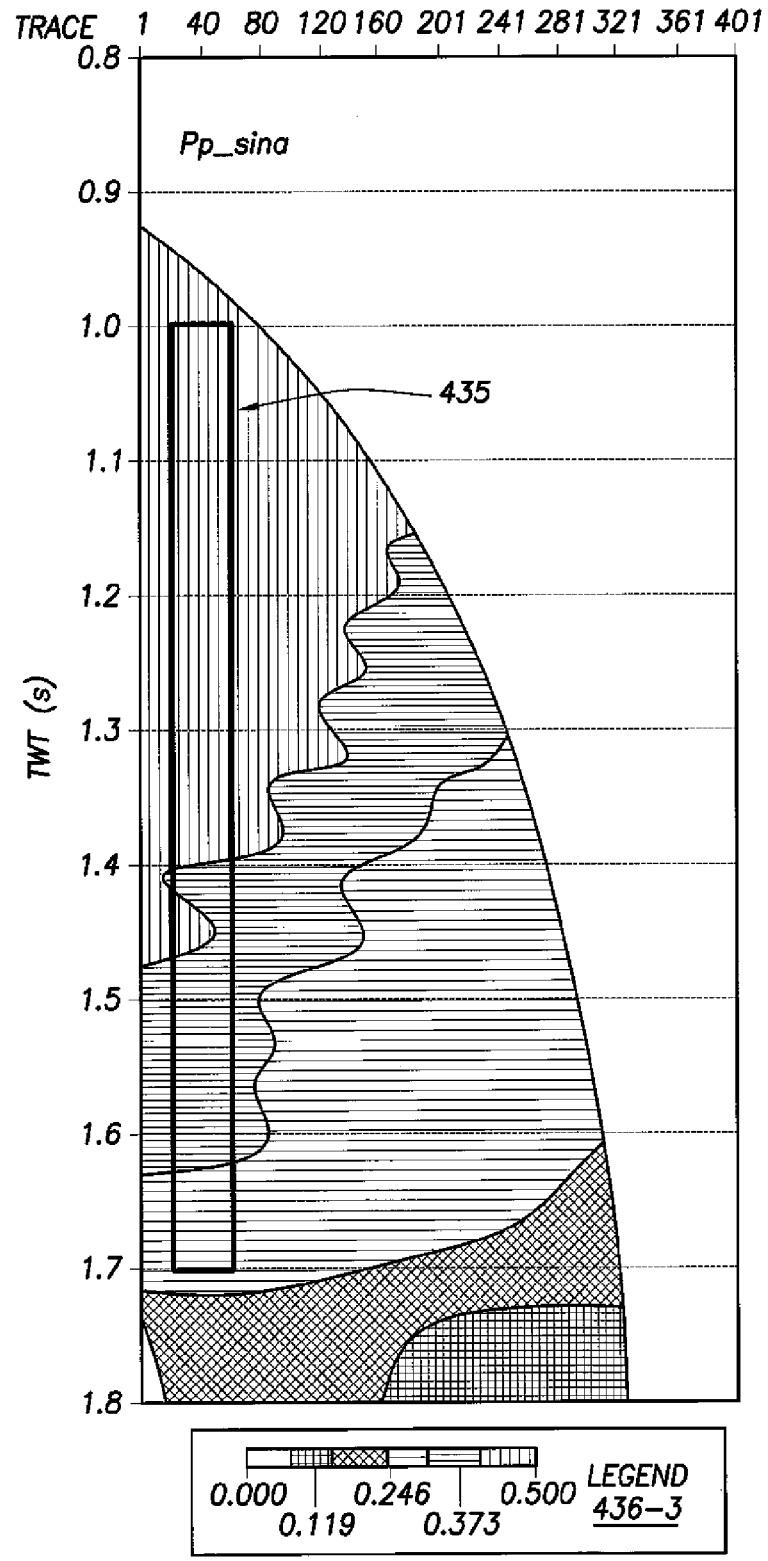
FIG.4.3.3

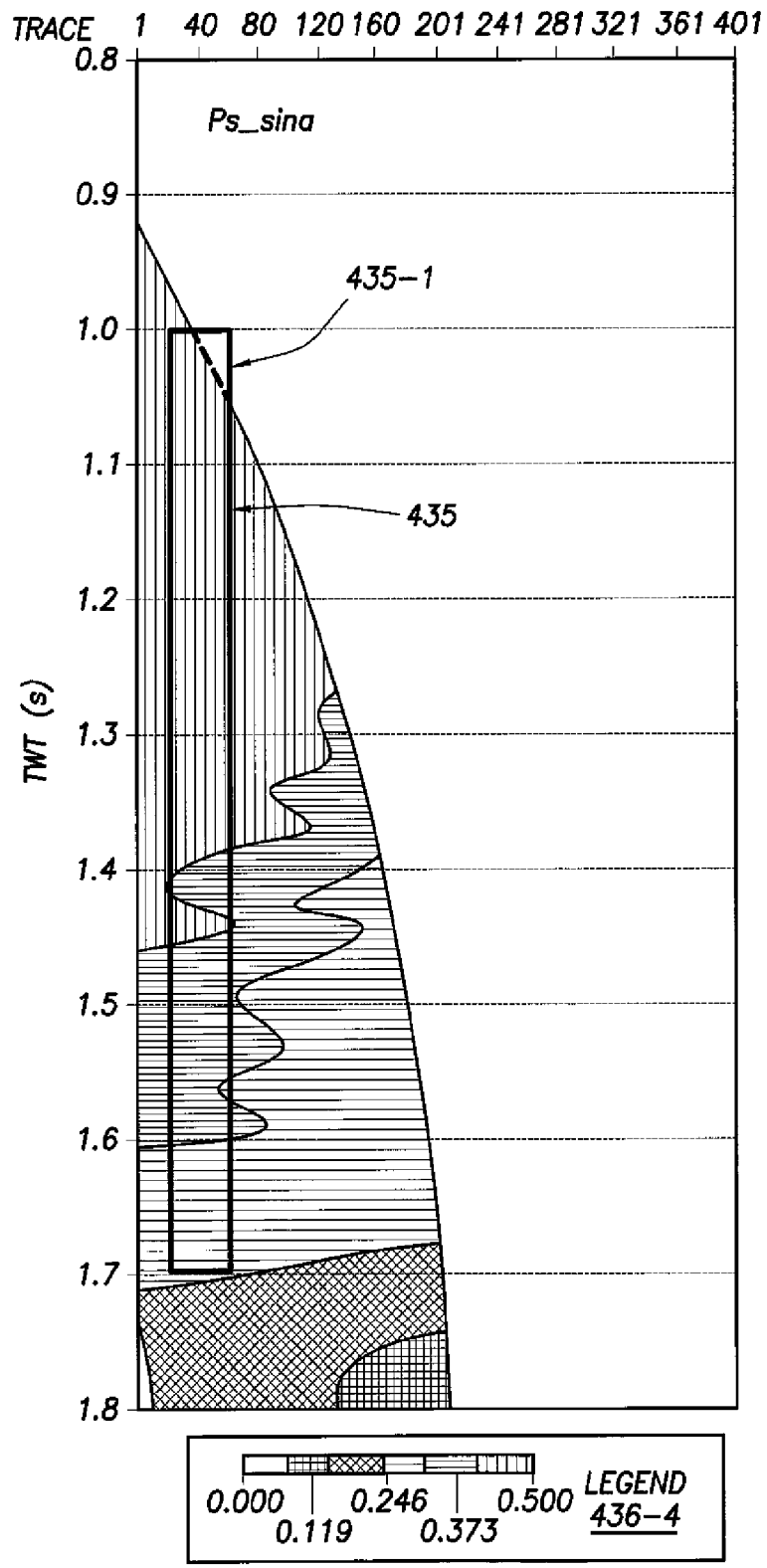
FIG.4.3.4

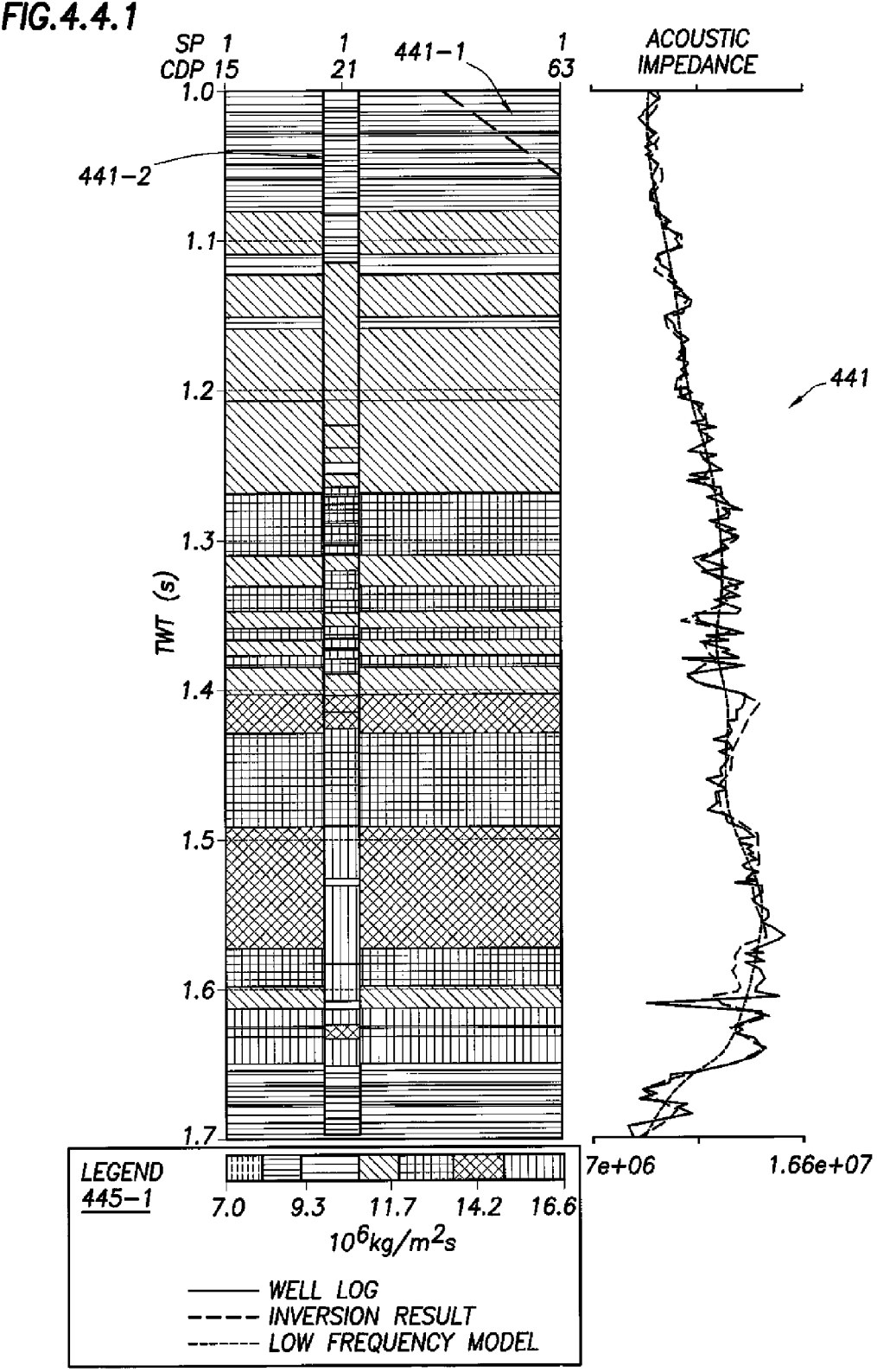
FIG.4.4.1

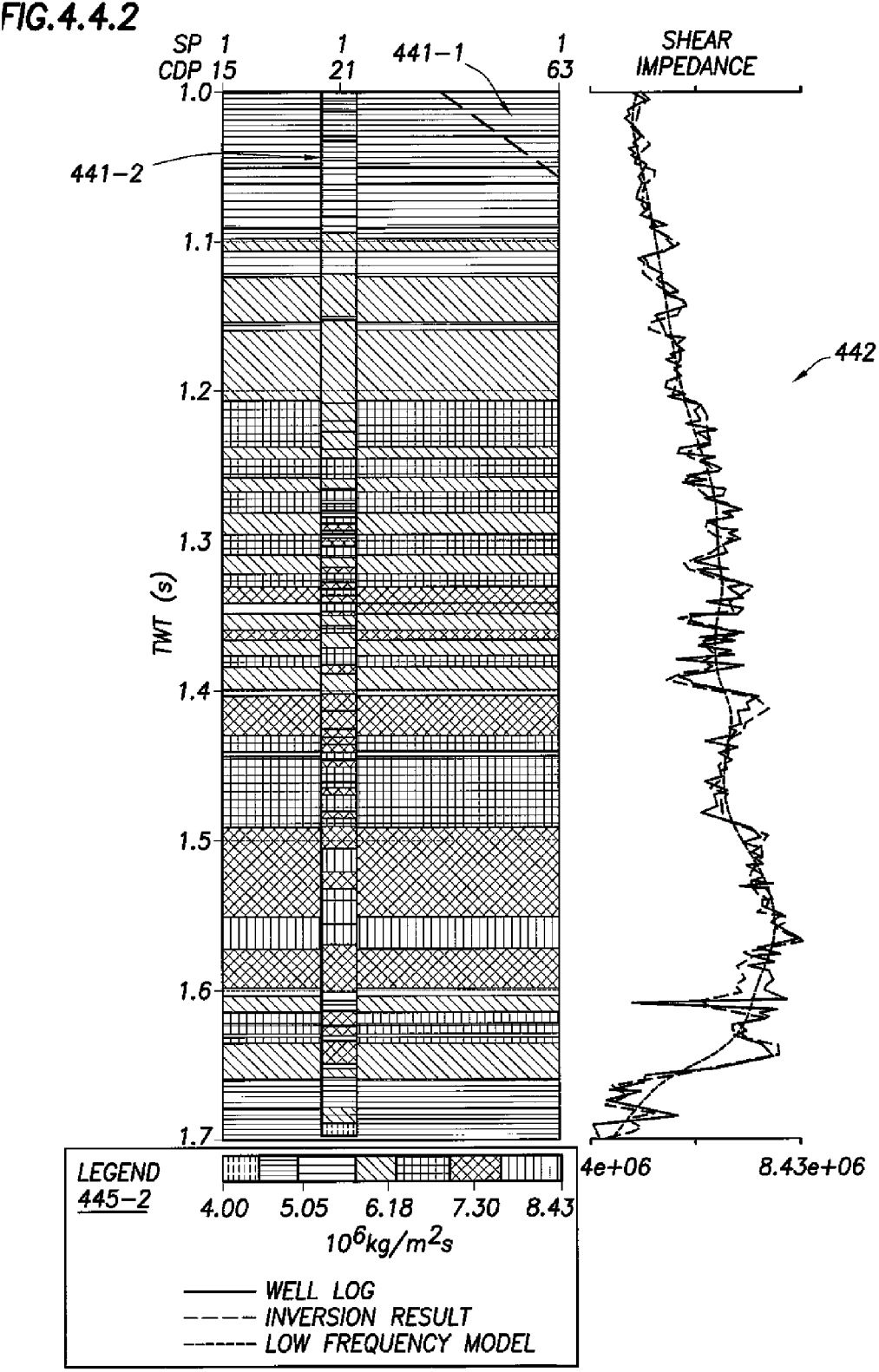
FIG.4.4.2

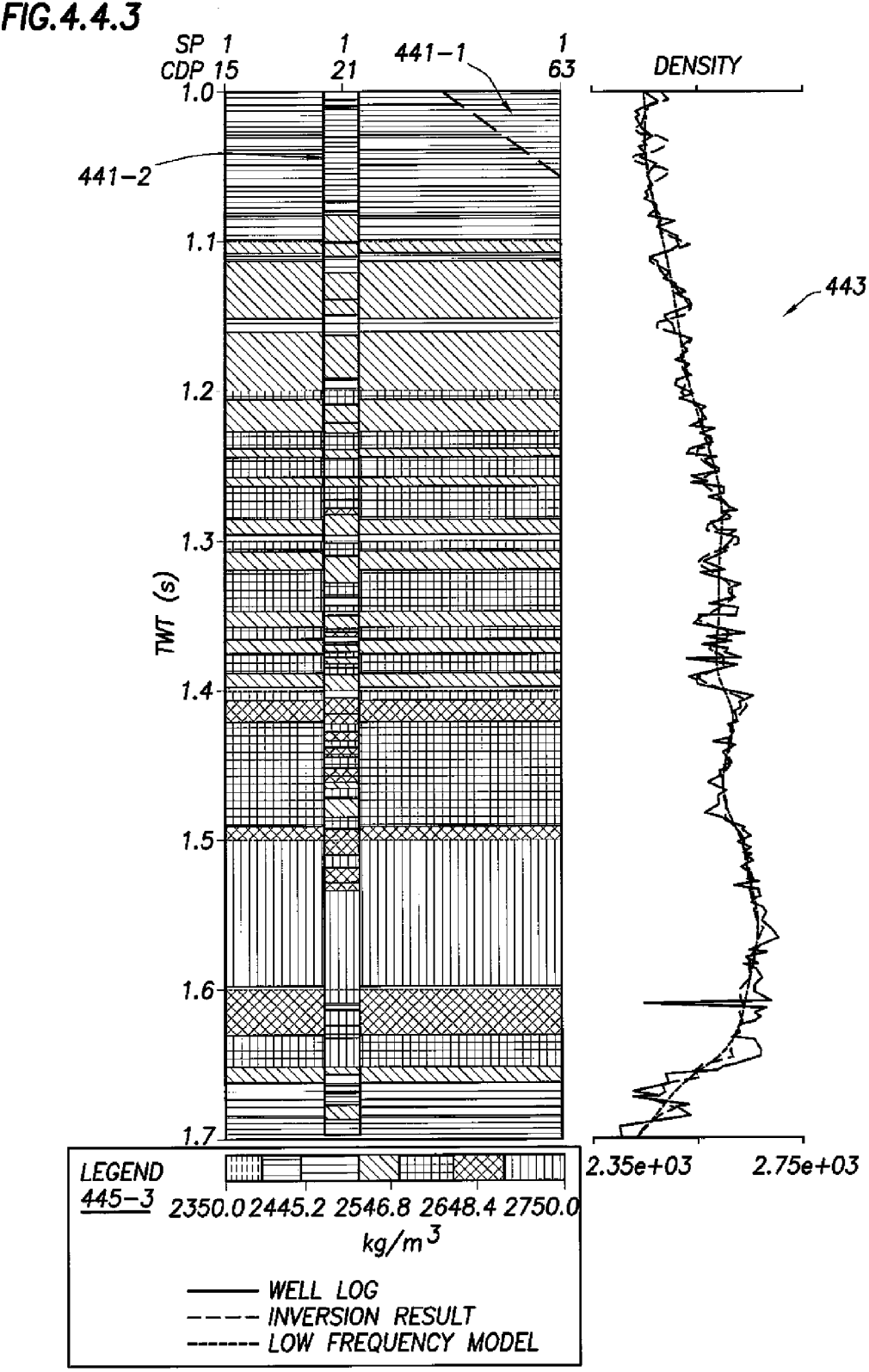
FIG.4.4.3

MULTICOMPONENT SEISMIC INVERSION OF VSP DATA

BACKGROUND

Operations, such as surveying, drilling, wireline testing, completions, production, planning and field analysis, are typically performed to locate and gather valuable downhole fluids. Surveys are often performed using acquisition methodologies, such as seismic scanners or surveyors to generate maps of underground formations. These formations are often analyzed to determine the presence of subterranean assets, such as valuable fluids or minerals, or to determine if the formations have characteristics suitable for storing fluids. Although the subterranean assets are not limited to hydrocarbon such as oil, throughout this document, the terms "oilfield" and "oilfield operation" may be used interchangeably with the terms "field" and "field operation" to refer to a field having any types of valuable fluids or minerals and field operations relating to any of such subterranean assets.

During drilling and production operations, data is typically collected for analysis and/or monitoring of the operations. Such data may include, for instance, information regarding subterranean formations, equipment, and historical and/or other data.

Various equipment may be positioned about the field to monitor field parameters, to manipulate the operations and/or to separate and direct fluids from the wells. Surface equipment and completion equipment may also be used to inject fluids into reservoirs, either for storage or at strategic points to enhance production of the reservoir.

It is well known that mechanical disturbances can be used to establish acoustic waves in earth formations surrounding a wellbore, and the properties of these waves can be measured to obtain information about the formations through which the waves have propagated. In geophysics, a Vertical Seismic Profile (VSP) refers to measurements made in a wellbore using geophones inside the wellbore and a source at the surface near the well. Typical applications of VSP measurements include obtaining images of higher resolution than surface seismic images and looking ahead of the drill bit during drilling operations. The acquisition geometry of VSPs may vary in the well configuration, the number and location of sources and geophones, and how the sources and geophones are deployed. Most VSPs use a surface seismic source, which is commonly a vibrator on land and an air gun in offshore or marine environments. Different types of VSPs include the zero-offset VSP, offset VSP, walkaway VSP, walkabove VSP, salt-proximity VSP, shear-wave VSP, and drill-noise or seismic-while-drilling VSP.

Seismic inversion is the process of transforming seismic reflection data into a quantitative rock property description of a reservoir (e.g., acoustic impedance, shear impedance, and density). Seismic inversion typically includes other reservoir measurements such as well logs and cores that contribute low frequency information below the seismic band and to constrain the inversion. VSP data is typically underutilized in seismic inversion workflows leading to results with unknown errors. For example, VSP-seismic inversion typically uses processed VSP data in the form of a one dimensional (1D) seismic trace (i.e., a corridor stack) by assuming a normal incidence angle with respect to subterranean reflectors (e.g., formation layers) and using downgoing waveform as a wavelet with no account for anelastic effects (e.g., caused by fine layering, pore fill, rock itself esp. clays) on the wavefield. As a result, typical VSP seismic inversion generates 1D traces representing the acoustic impedance and lacking shear impedance and density information.

The normal incidence angle assumption may cause the estimate for acoustic impedance to be less accurate and, in some cases, cause the estimate to be invalid when the actual angle of incidence differs more than 15 degrees or so from the normal incidence assumption. In addition, using the downgoing wavefield as input wavelet has proven to be incorrect in that an extracted upgoing wavelet (by comparing upgoing wavefield to logs) is often rotated, which can have significant impact to the inversion result. Furthermore, attempt to apply VSP-seismic inversion workflow to deviated wells have been unsuccessful.

SUMMARY

In one or more implementations of multicomponent seismic inversion of VSP data, the method includes obtaining an initial velocity model of the subterranean formation, the initial velocity model comprising acoustic velocities of wave propagation in proximity to the wellbore, determining an acquisition geometry for obtaining the VSP data, the acquisition geometry comprising a plurality of receiver locations within the wellbore and a source location, performing a seismic survey to obtain the VSP data based on the acquisition geometry, analyzing, using a central processing unit (CPU) of a computer system, direct arrival signals of the VSP data to generate transit time data for wave propagation from the source location to the plurality of receiver locations, modifying, using the CPU, the initial velocity model to generate an updated velocity model by performing a tomographic inversion of the transit time data, generating, using the CPU, an elastic model of the subterranean formation by performing the seismic inversion of the VSP data using the updated velocity model, and adjusting the operations of the oilfield based on the elastic model.

Other aspects of multicomponent seismic inversion of VSP data will be apparent from the following description and the appended claims.

BRIEF DESCRIPTION OF DRAWINGS

The appended drawings illustrate several embodiments of multicomponent seismic inversion of VSP data and are not to be considered limiting of its scope, for multicomponent seismic inversion of VSP data may admit to other equally effective embodiments.

FIG. 1.1 depicts a schematic view, partially in cross-section, of a field having a plurality of data acquisition tools positioned at various locations along the field for collecting data from the subterranean formation, in which embodiments of multicomponent seismic inversion of VSP data may be implemented.

FIG. 1.2 depicts an earth formation penetrated by a wellbore and having an example VSP acquisition equipment for which embodiments of multicomponent seismic inversion of VSP data may be implemented.

FIG. 4.1 depicts an example workflow for multicomponent seismic inversion of VSP data in accordance with one or more embodiments.

FIG. 4.2 depicts an example initial velocity model for multicomponent seismic inversion of VSP data in accordance with one or more embodiments.

FIG. 4.3 depicts example processed VSP data for multicomponent seismic inversion of VSP data in accordance with one or more embodiments. FIG. 4.3 is drawn on four sheets as FIGS. 4.3.1-4.3.4 for clarity.

FIG. 4.4 depicts example results for multicomponent seismic inversion of VSP data in accordance with one or more embodiments. FIG. 4.4 is drawn on three sheets as FIGS. 4.4.1-4.4.3 for clarity.

DETAILED DESCRIPTION

Figure 2:
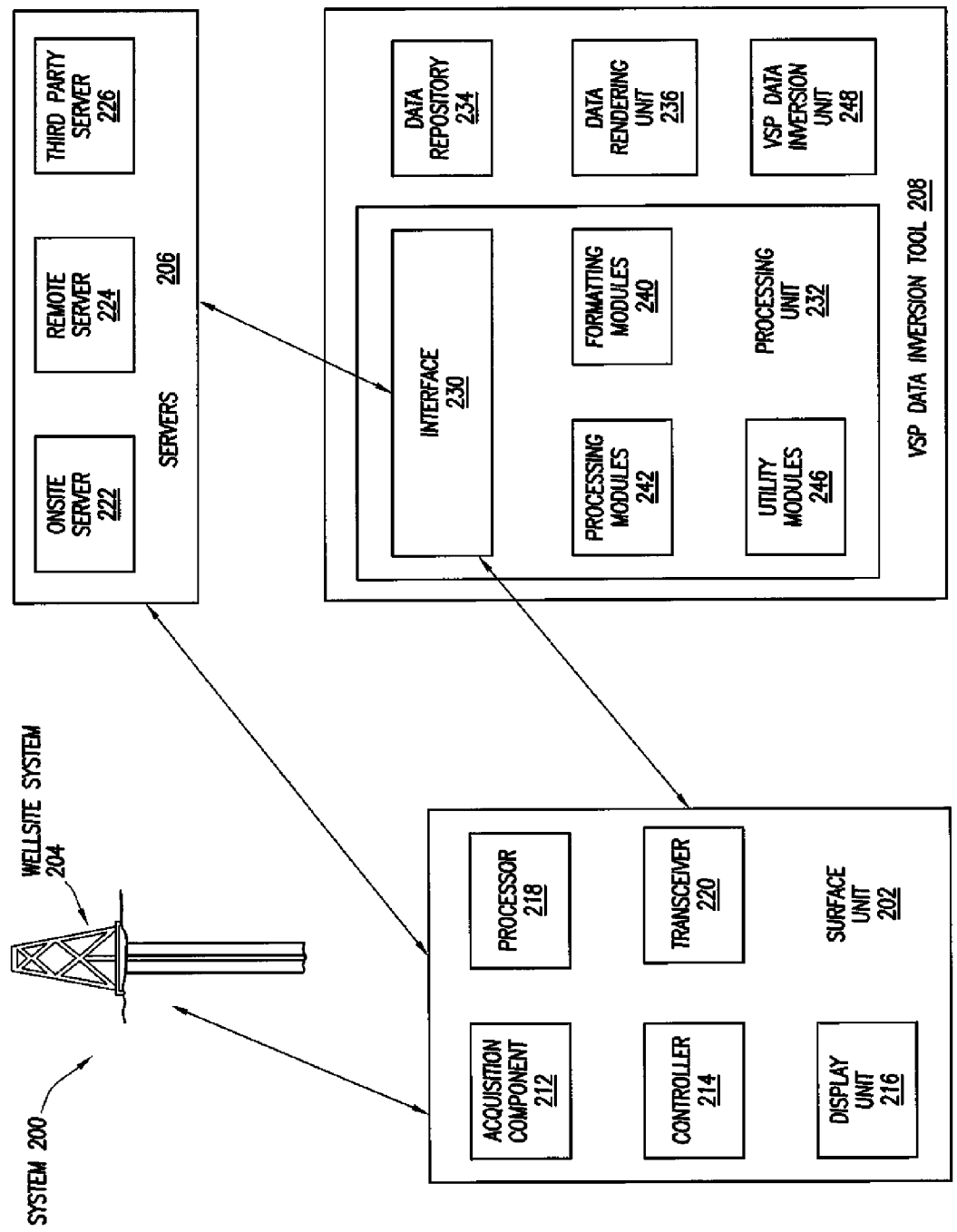
FIG. 2 depicts a system in which one or more embodiments of multicomponent seismic inversion of VSP data may be implemented.

Embodiments are shown in the above-identified drawings and described below. In describing the embodiments, like or identical reference numerals are used to identify common or similar elements. The drawings are not necessarily to scale and certain features and certain views of the drawings may be shown exaggerated in scale or in schematic in the interest of clarity and conciseness.

Generally speaking, multicomponent seismic inversion of VSP data relates to a seismic inversion of two dimensional (2D) seismic images including both acoustic (pressure) to acoustic (pressure) (i.e., P to P) and acoustic to shear (i.e., P to S) reflection amplitudes as well as related incidence angle and reflection angle. In the case of a vertical well, the 2D seismic images may be degenerated to one dimensional (1D) seismic images. In one or more embodiments, multicomponent seismic inversion of VSP data is performed without the aforementioned assumptions related to the normal incidence angle and the downgoing wavefield to be based on the following:

a. Using a non-normal incidence angle in a depth/time dependent angle model to compute an elastic model of the earth formation to include shear impedance and density information in addition to the acoustic impedance.
 b. Including both 1D, 2D, and 3D seismic images.
 c. Combining an upgoing wavefield with well logs as input (e.g., time variant) to estimate wavelet operators for the seismic inversion.
 d. Estimation and compensation for anelastic effects and Q factor on the wavefield. More details of wavelet operators, anelastic effects, and Q factor are described with respect to FIG. 4.1 below.

FIG. 1.1 depicts a schematic view, partially in cross section of a field (100) having data acquisition tools (102-1), (102-2), (102-3), and (102-4) positioned at various locations in the field for gathering data of a subterranean formation (104). As shown, the data collected from the tools (102-1 through 102-4) can be used to generate data plots (108-1 through 108-4), respectively.

As shown in FIG. 1.1, the subterranean formation (104) includes several geological structures (106-1 through 106-4). As shown, the formation has a sandstone layer (106-1), a limestone layer (106-2), a shale layer (106-3), and a sand layer (106-4). A fault line (107) extends through the formation. In one or more embodiments, the static data acquisition tools are adapted to measure the formation and detect the characteristics of the geological structures of the formation.

As shown in FIG. 1.1, a drilling operation is depicted as being performed by drilling tools (102-2) suspended by a rig (101) and advanced into the subterranean formations (104) to form a wellbore (103). The drilling tools (106b) may be adapted for measuring downhole properties using logging-while-drilling ("LWD") tools.

A surface unit (now shown) is used to communicate with the drilling tools (102-2) and/or offsite operations. The surface unit is capable of communicating with the drilling tools (102-2) to send commands to the drilling tools (102-2), and to receive data therefrom. The surface unit may be provided with computer facilities for receiving, storing, processing, and/or analyzing data from the oilfield. The surface unit collects data generated during the drilling operation and produces data output which may be stored or transmitted. Computer facilities, such as those of the surface unit, may be positioned at various locations about the oilfield and/or at remote locations.

Sensors, such as gauges, may be positioned about the oilfield to collect data relating to various oilfield operations as described previously. For example, the sensor may be positioned in one or more locations in the drilling tools (102-2) and/or at the rig (101) to measure drilling parameters, such as weight on bit, torque on bit, pressures, temperatures, flow rates, compositions, rotary speed and/or other parameters of the oilfield operation.

The data gathered by the sensors may be collected by the surface unit and/or other data collection sources for analysis or other processing. The data collected by the sensors may be used alone or in combination with other data. The data may be collected in one or more databases and/or transmitted on or offsite. All or select portions of the data may be selectively used for analyzing and/or predicting oilfield operations of the current and/or other wellbores. The data may be may be historical data, real time data or combinations thereof. The real time data may be used in real time, or stored for later use. The data may also be combined with historical data or other inputs for further analysis. The data may be stored in separate databases, or combined into a single database.

The collected data may be used to perform activities, such as wellbore steering. In another example, the seismic data output may be used to perform geological, geophysical, and/or reservoir engineering. In this example, the reservoir, wellbore, surface and/or process data may be used to perform reservoir, wellbore, geological, geophysical, or other simulations. The data outputs from the oilfield operation may be generated directly from the sensors, or after some preprocessing or modeling. These data outputs may act as inputs for further analysis.

As shown in FIG. 1.1, data plots (108-1 through 108-4) are examples of plots of static and/or dynamic properties that may be generated by the data acquisition tools (102-1 through 102-4), respectively. For example, data plot (108-1) is a seismic two-way response time. In another example, data plot (108-2) is core sample data measured from a core sample of the formation (104). In another example, data plot (108-3) is a logging trace. In another example, data plot (108-4) is a plot of a dynamic property, the fluid flow rate over time. Those skilled in the art will appreciate that other data may also be collected, such as, but not limited to, historical data, user inputs, economic information, other measurement data, and other parameters of interest.

While a specific subterranean formation (104) with specific geological structures is depicted, it will be appreciated that the formation may contain a variety of geological structures. Fluid, rock, water, oil, gas, and other geomaterials may also be present in various portions of the formation. Each of the measurement devices may be used to measure properties of the formation and/or its underlying structures. While each acquisition tool is shown as being in specific locations along the formation, it will be appreciated that one or more types of measurement may be taken at one or more location across one or more fields or other locations for comparison and/or analysis using one or more acquisition tools. The terms measurement device, measurement tool, acquisition tool, and/or field tools are used interchangeably in this documents based on the context.

The data collected from various sources, such as the data acquisition tools of FIG. 1.1, may then be evaluated. Typically, seismic data displayed in the data plot (108-1) from the data acquisition tool (102-1) is used by a geophysicist to determine characteristics of the subterranean formation (104). Core data shown in plot (108-2) and/or log data from the well log(108-3) is typically used by a geologist to determine various characteristics of the geological structures of the subterranean formation (104). Production data from the production graph (108-4) is typically used by the reservoir engineer to determine fluid flow reservoir characteristics.

FIG. 1.2 depicts an earth formation penetrated by a wellbore and having example VSP acquisition equipment for which embodiments of multicomponent seismic inversion of VSP data may be implemented. For example, earth formation (120) may be essentially the same as the formation (104) in FIG. 1.1 above while the sea based rig (111) and wellbore (112) perform similar functions as the land based rig (101 of FIG. 1.1) and wellbore (103 of FIG. 1.1). Although earth formation (104 of FIG. 1.1) is located on land while formation (120) is located under the sea, boundaries of formation layers (106-1 through 106-4) depicted in FIG. 1.1 may act as seismic wave reflectors in essentially the same way as the sea bed (123) and formation layer boundary (121) depicted in FIG. 1.2. Further, while the data acquisition tool (102-1) and the seismic trace (108-1) of FIG. 1.1 relate to surface seismic surveys, VSP acquisition equipment is shown in FIG. 1.2.

As shown in FIG. 1.2, a seismic source (113) (e.g., a gun array device) is located at the sea surface (122) and generates seismic waves propagating along various ray paths such as a direct arrival ray path (115-1), a down going multiple ray path (115-2), a reflected primary ray path (115-3), and a reflected upgoing multiple ray path (115-4). Such seismic waves are recorded by one or more receivers (e.g., a geophone) located at various depths (e.g., 114-1, 114-2, 114-3, etc.) within the wellbore (112) as time based trace data (e.g., 116-0 through 116-5) depicted as horizontal lines along a time scale interspersed with signal packets (e.g., 117-1 through 117-4 referred to as wiggles by those skilled in the art). For example, the time based trace data (116-1), (116-2), and (116-3) are recorded by receiver(s) located at depths of (114-1), (114-2), and (114-3), respectively. Positions of such signal packets (e.g., 117-1 through 117-4) along the time scales of various trace data (e.g., 116-0 through 116-5) represents the transit time of seismic wave propagation along various ray paths (e.g., 115-1 through 115-4) to arrive at the respective receivers or receiver locations. Such time based trace data (e.g., 116-0 through 116-5) are included in raw VSP data, which is subsequently processed to generate processed VSP data. Various formats of raw VSP data and processed VSP data are generally referred to as VSP data. Examples of VSP data are described with respect to FIGS. 4.3 and 4.4 below.

In one or more embodiments, multiple receivers may be located at separate depths within a range for recording the seismic waves simultaneously. Alternatively, one or more receivers may be disposed on a wireline and lowered to multiple depths within a range to record the seismic waves in multiple passes. The recording of seismic waves using a seismic source and receivers is referred to as VSP acquisition. The recorded VSP data depends on specific configurations of the locations of the seismic source and the receivers. Such specific configurations are referred to as acquisition geometry. Generally speaking, the acquisition geometry is configured to allow the ray paths travelled by the seismic waves to sufficiently traverse an area of interest (e.g., in proximity of the wellbore) for the VSP acquisition.

As shown in FIG. 1.2, seismic waves propagating along the direct arrival ray path (115-1) arrive at the receiver at depth (114-1) without reflection and are recorded as a direct arrival signal (117-1) in the time based trace data (116-1). Seismic waves propagating along the down going multiple ray path (115-2) arrive at the receiver at depth (114-1) subsequent to multiple reflections at the sea surface (122) and sea bed (123) and are recorded as a down going multiple signal (117-2) in the time based trace data (116-1). Seismic waves propagating along the reflected primary ray path (115-3) arrive at the receiver at depth (114-1) subsequent to a single reflection at the formation layer boundary (121) and are recorded as a reflected primary signal (117-3) in the time based trace data (116-1). Seismic waves propagating along the reflected upgoing multiple ray path (115-4) arrive at the receiver at depth (114-1) subsequent to multiple reflections at the sea surface (122), sea bed (123), and formation layer boundary (121) and are recorded as a reflected upgoing multiple signal (117-4) in the time based trace data (116-1). The direct arrival signal (117-1), the down going multiple signal (117-2), the reflected primary signal (117-3), and the reflected upgoing multiple signal (117-4) in the time based trace data (116-1) are processed along with various signals in other time based trace data (e.g., 116-0, 116-2, 116-3, 116-4, 116-5, etc.) to become portions of various formats of VSP data that are referred to as direct arrival signals, down going multiple signals, reflected primary signals, and reflected upgoing multiple signals, respectively, of the VSP data in various formats.

Prior art methods for performing seismic inversion of VSP data focus on extracting reflected primary signals from VSP data for analysis. Typically, the other portions of the VSP data are discarded because the prior art methods are unable to utilize the other portions. In one or more embodiments of multicomponent seismic inversion of VSP data, the direct arrival signals and other 2D seismic images are analyzed to generate transit time and depth dependent angle information to be used in conjunction with the reflected primary signals in performing the seismic inversion of VSP data. Additional details of using the direct arrival signals and other 2D seismic images for seismic inversion of VSP data are described below.

FIG. 2 depicts a system (200) incorporated with a portion of a field, as shown and described above with respect to FIG. 1.1. As shown, the system (200) includes a surface unit (202) operatively connected to a wellsite system (204), servers (206), and a VSP data inversion tool (208) via an interface (230) on the VSP data inversion tool (208). The VSP data inversion tool (208) is also operatively linked, via the interface (230), to the servers (206). The surface unit (202) and wellsite system (204) may include various field tools and wellsite facilities. As shown, communication links are provided between the surface unit (202) and the wellsite system (204), servers (206), and VSP data inversion tool (208). A communication link is also provided between the VSP data inversion tool (208) and the servers (206). A variety of links may be provided to facilitate the flow of data through the system (200). For example, the communication links may provide for continuous, intermittent, one-way, two-way and/or selective communication throughout the system (200). The communication links may be of any type, including but not limited to wired and wireless.

In one or more embodiments, the wellsite system (204) may be associated with a rig (e.g., rig (101), (111)), a wellbore (e.g., wellbore (103), (112)), and other wellsite equipments and is configured to perform oilfield operations as described above with respect to FIGS. 1.1 and 1.2. Specifically, the wellsite system (204) may be configured to perform operations (e.g., VSP acquisition, drilling, fracturing, production, or other oilfield operations) as directed by a surface unit (202). In one or more embodiments, the surface unit (202) is provided with an acquisition component (212), a controller (214), a display unit (216), a processor (218), and a transceiver (220). The acquisition component (212) collects and/or stores data of the field. The field data may be measured by sensors at the wellsite. The field data may also be received from other sources, such as those described with respect to FIG. 1.1 above. In one or more embodiments, the field data includes VSP data, well logs, and other data related to formation tops, horizons, well deviation, etc.

The controller (214) may be enabled to enact commands at the field. The controller (214) may be provided with actuation means that can perform drilling operations, such as steering, advancing, etc., or otherwise taking action for other operations, such as fracturing, production, etc. at the wellsite. Commands may be generated based on logic of the processor (218), or by commands received from other sources. In one or more embodiments, the processor (218) is provided with features for manipulating and analyzing the data. The processor (218) may be provided with additional functionality to perform field operations.

In one or more embodiments, a display unit (216) may be provided at the wellsite and/or remote locations for viewing field data (not shown). The field data represented by the display unit (216) may be raw data, processed data and/or data outputs generated from various data. In one or more embodiments, the display unit (216) is adapted to provide flexible views of the data, so that the screens depicted may be customized as desired. A user may plan, adjust, and/or otherwise perform field operations (e.g., determine the desired course of action during field operations) based on reviewing the displayed field data. The field operations may be selectively adjusted in response to viewing the data on the display unit (216). The display unit (216) may include a two-dimensional (2D) display or a three-dimensional (3D) display for viewing field data or various aspects of the field operations.

In one or more embodiments, the transceiver (220) provides a means for providing data access to and/or from other sources. The transceiver (220) may also provide a means for communicating with other components, such as the servers (206), the wellsite system (204), the surface unit (202), and/or the VSP data inversion tool (208).

The servers (206) may be configured to transfer data from a surface unit (202) at one or more wellsites to the VSP data inversion tool (208). As shown, the servers (206) include an onsite server (222), a remote server (224), and a third party server (226). The onsite server (222) may be positioned at the wellsite and/or other locations for distributing data from the surface unit (202). As shown, the remote server (224) is positioned at a location away from the field and provides data from remote sources. The third party server (226) may be onsite or remote, but is often operated by a third party, such as a client.

In one or more embodiments, the servers (206) are capable of transferring data, such as logs, drilling events, trajectory, seismic data (e.g., VSP), historical data, economics data, other field data, and/or other data that may be of use during analysis. The type of server is not intended to limit multicomponent seismic inversion of VSP data. In one or more embodiments, the system is adapted to function with any type of server that may be employed.

In one or more embodiments, the servers (206) communicate with the VSP data inversion tool (208) through the communication links. As indicated by the multiple arrows, the servers (206) may have separate communication links with the VSP data inversion tool (208) and the surface unit (202). One or more of the servers (206) may be combined or linked to provide a combined communication link.

In one or more embodiments, the servers (206) collect a wide variety of data. The data may be collected from a variety of channels that provide a certain type of data, such as VSP data, well logs, an other data related to formation tops, horizons, well deviation, etc. The data from the servers is passed to the VSP data inversion tool (208) for processing. The servers (206) may also be configured to store and/or transfer data. For example, the data may be collected at the wellsite system (204) using VSP acquisition equipments, measurements-while-drilling (MWD) tools, logging-while-drilling (LWD) tools, any other similar types of measurement tools, or any suitable combination thereof. Recording VSP data using VSP acquisition equipment is described in reference to FIG. 1.2 above. In addition, the MWD tools and/or LWD tools may be configured to obtain well logs of formation parameters such as resistivity, porosity, sonic velocity, gamma ray, etc. within the wellbore of the wellsite system (204). Further, a formation model may be formulated based on magnetometer data obtained using a MWD tool or electrical images of the wellbore obtained using a LWD tool. In one or more embodiments, VSP data and well data are combined to derive wavelet operators for seismic inversion while a formation model is used as a low frequency model to provide background information below the seismic band.

In one or more embodiments, the VSP data inversion tool (208) is operatively linked to the surface unit (202) for receiving data therefrom. In some cases, the VSP data inversion tool (208) and/or server(s) (206) may be positioned at the wellsite. The VSP data inversion tool (208) and/or server(s) (206) may also be positioned at various locations. The VSP data inversion tool (208) may be operatively linked to the surface unit (202) via the server(s) (206). The VSP data inversion tool (208) may also be included in or located near the surface unit (202).

In one or more embodiments, the VSP data inversion tool (208) includes an interface (230), a processing unit (232), a data repository (234), a data rendering unit (236), and a VSP data inversion unit (248). In one or more embodiments, the VSP data inversion unit (248) of the VSP data inversion tool (208) is configured to transform VSP data into an elastic model of the formation (e.g., acoustic impedance model, shear impedance model, and/or density model). More specifically, the VSP data inversion unit (248) may be configured to use 1D and 2D seismic images obtained by the VSP acquisition equipment and downhole properties obtained by MWD tools and/or LWD tools at the wellsite system (204) to compute acoustic impedance, shear impedance, and density in proximity of the wellbore. In this case, the downhole properties may be obtained from the servers (206), where the wellsite system (204) and surface unit (202) are configured to store the downhole properties in the servers (206) in real time.

In one or more embodiments, the interface (230) of the VSP data inversion tool (208) is configured to communicate with the servers (206) and the surface unit (202). The interface (230) may also be configured to communicate with other oilfield or non-oilfield sources. The interface (230) may be configured to receive the data and map the data for processing. In one or more embodiments, data from the servers (206) is sent along predefined channels, which may be selected by the interface (230).

As depicted in FIG. 2, the interface (230) selects the data channel of the server(s) (206) and receives the data. In one or more embodiments, the interface (230) also maps the data channels to data from the wellsite (204). The data may then be passed from the interface (230) to the processing modules (242) of the processing unit (232). In one or more embodiments, the data is immediately incorporated into the VSP data inversion tool (208) for real time sessions and/or modeling. The interface (230) may create data requests (e.g., profiles, surveys, logs, MWD/LWD data, etc.), display the user interface, and monitor connection state events. In one or more embodiments, the interface (230) also instantiates the data into a data object for processing.

In one or more embodiments, the processing unit (232) includes formatting modules (240), processing modules (242), and utility modules (246). These modules are configured to manipulate the field data for analysis, potentially in real time.

In one or more embodiments, the formatting modules (240) transform the data to a desired format for processing. Incoming data may be formatted, translated, converted, or otherwise manipulated for use. In one or more embodiments, the formatting modules (240) are configured to enable the data from a variety of sources to be formatted and used so that the data processes and displays in real time.

In one or more embodiments, the utility modules (246) provide support functions to the VSP data inversion tool (208). In one or more embodiments, the utility modules (246) include a logging component (not shown) and a user interface (UI) manager component (not shown). The logging component provides a common call for the logging data, which means that the utility modules (246) allow the logging destination to be set by the application. The logging component may also be provided with other features, such as a debugger, a messenger, and a warning system, among others. The debugger sends a debug message to those using the system. The messenger sends information to subsystems, users, and others. The information sent by the messenger may or may not interrupt the operation and may be distributed to various locations and/or users throughout the system. The warning system may be configured to send error messages and warnings to various locations and/or users throughout the system. In some cases, the warning messages may interrupt the process and display alerts.

In one or more embodiments, the UI manager component (not shown) creates user interface elements for displays. The UI manager component defines user input screens, such as menu items, context menus, toolbars, and settings windows. The UI manager may also be configured to direct events relating to these user input screens.

In one or more embodiments, the processing modules (242) are configured to analyze the data and generate outputs. As described above, the data analyzed by the processing modules (242) may include static data, dynamic data, historic data, real time data, or other types of data. Further, the data analyzed by the processing modules (242) may relate to various aspects of the field operations, such as formation structure, geological stratigraphy, core sampling, well logging, density, resistivity, fluid composition, flow rate, downhole condition, surface condition, equipment condition, and/or other aspects of the field operations. In one or more embodiments, the data is processed by the processing module (242) into multiple volume data sets for storage and retrieval.

In one or more embodiments, the data repository (234) stores the data for the VSP data inversion tool (208). The data stored in the data repository (234) may be in a format available for use in real time (e.g., information is updated at approximately the same rate that the information is received). In one or more embodiments, the data is passed to the data repository (234) from the processing modules (242). The data can be persisted in the file system (e.g., as an extensible markup language (XML) file) or in a database. The user, a computer program, or some other determining entity may determine which storage is the most appropriate to use for a given piece of data and stores the data in a manner to enable automatic flow of the data through the rest of the system in a seamless and integrated fashion. The system may also facilitate manual and automated workflows (e.g., Modeling, Geological, and Geophysical workflows) based upon the persisted data.

In one or more embodiments, the data rendering unit (236) performs rendering algorithm calculations to provide one or more displays for visualizing the data. The displays for visualizing the data may be presented, using one or more communication links, to a user at the display unit (216) of the surface unit (202). The data rendering unit (236) may contain a 2D canvas, a 3D canvas, a well section canvas, or other canvases, either by default or as selected by a user. The data rendering unit (236) may selectively provide displays composed of any combination of one or more canvases. The canvases may or may not be synchronized with each other during display. In one or more embodiments, the data rendering unit (236) is provided with mechanisms for actuating various canvases or other functions in the system. Further, the data rendering unit (236) may selectively provide displays composed of any combination of one or more volume data sets. The volume data sets typically contain exploration and production data.

While specific components are depicted and/or described for use in the units and/or modules of the VSP data inversion tool (208), it will be appreciated that a variety of components with various functions may be configured to provide the formatting, processing, utility, and coordination functions necessary to process data in the VSP data inversion tool (208). The components may have combined functionalities and may be implemented as software, hardware, firmware, or suitable combinations thereof.

Further, components (e.g., the processing modules (242), the data rendering unit (236), etc.) of the VSP data inversion tool (208) may be located in an onsite server (222) or in distributed locations where a remote server (224) and/or a third party server (226) may be involved. The onsite server (222) may be located within the surface unit (202).

Figure 3:
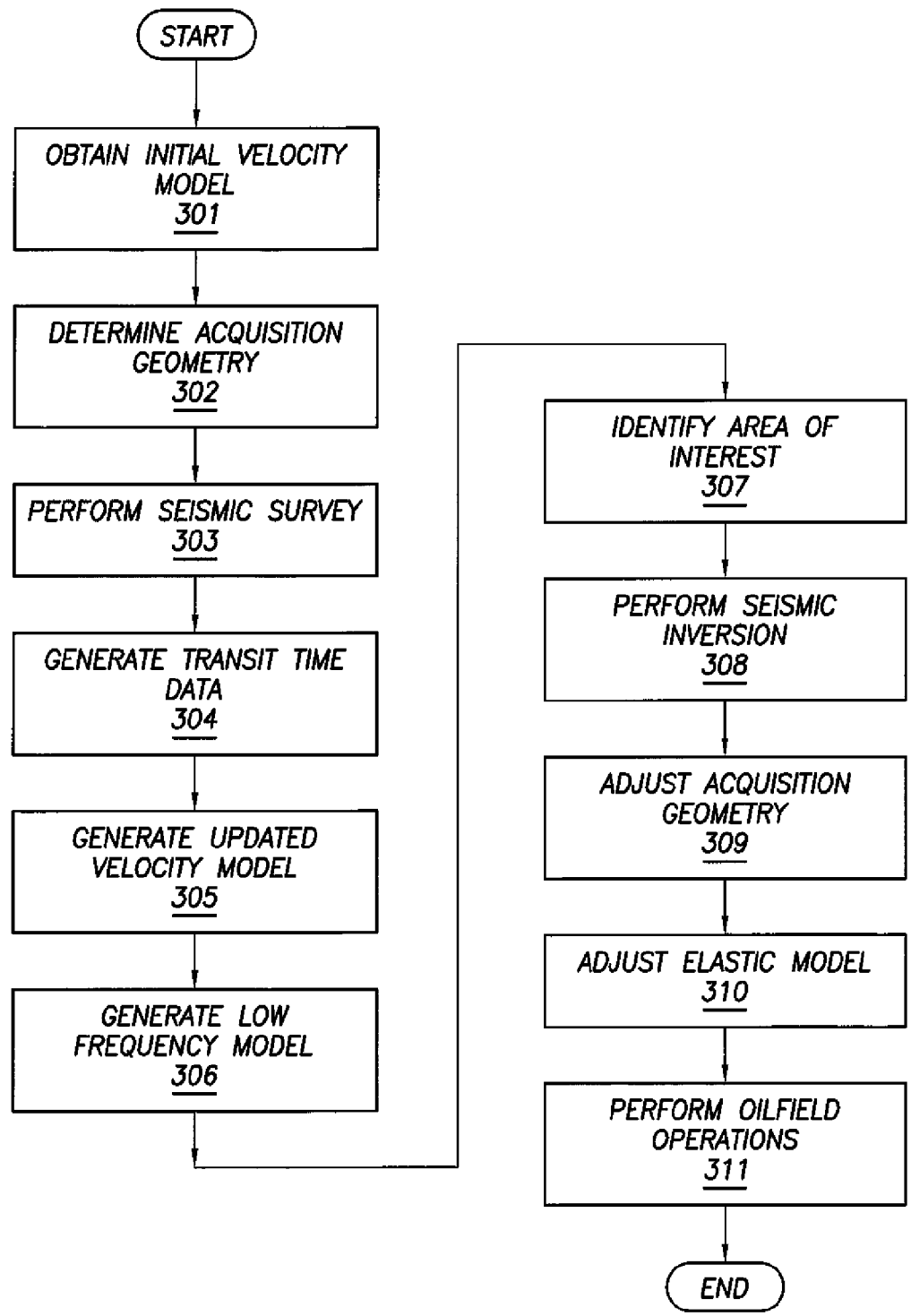
FIG. 3 depicts an example method for multicomponent seismic inversion of VSP data in accordance with one or more embodiments.

FIG. 3 depicts an example method for multicomponent seismic inversion of VSP data in accordance with one or more embodiments. For example, the method depicted in FIG. 3 may be practiced using the VSP data inversion tool (208) described in reference to FIG. 2 above. In one or more embodiments of the invention, one or more of the elements shown in FIG. 3 may be omitted, repeated, and/or performed in a different order. Accordingly, embodiments of multicomponent seismic inversion of VSP data should not be considered limited to the specific arrangements of elements shown in FIG. 3.

Initially, in Element (301), an initial velocity model of the subterranean formation is obtained, the initial velocity model represents acoustic velocities of wave propagation in proximity to the wellbore. In one or more embodiments, the initial velocity model is based on historical data and/or estimation and includes a 1D velocity model. Examples of obtaining the initial velocity model are described in reference to FIGS. 4.1 and 4.2 below.

In Element (302), an acquisition geometry is determined for obtaining the VSP data. As described in reference to FIG. 1.2 above, the acquisition geometry represents a seismic source location and one or more receiver locations within the wellbore. In one or more embodiments, the acquisition geometry is determined such that seismic waves traverse an area of interest in proximity of the wellbore to obtain sufficient 2D seismic images of both amplitude and angle information. Examples of determining acquisition geometry for obtaining the VSP data are described in reference to FIGS. 4.1 and 4.4 below.

In Element (303), a seismic survey is performed to obtain the VSP data using the acquisition geometry. An example of performing a seismic survey to obtain the VSP data based on the acquisition geometry is described in reference to FIG. 1.2 above.

In Element (304), direct arrival signals of the VSP data are analyzed to generate transit time (i.e., seismic wave propagation delay time) data for wave propagation from the source location to the receiver locations. As is described in reference to FIG. 1.2 above, positions of signal packets along the time line of the time based trace data represents seismic wave propagation delays from the source to the receiver while the direct arrival signals traverse the direct distance from the source to the receiver without reflection. Because the direct distance is defined by the pre-determined acquisition geometry, transit time data may be derived by analyzing the direct arrival signals in the time based trace data.

In Element (305), the initial velocity model is modified to generate an updated velocity model by performing a tomographic inversion of the transit time data. In some embodiments, the acquisition geometry is determined such that the direct arrival ray path sweeps the area of interest in proximity of the wellbore as the receiver is lowered through a range within the wellbore. In other embodiments, the acquisition geometry is determined such that the direct arrival ray paths from the seismic source to multiple receivers cover the area of interest in proximity of the wellbore. Accordingly, VSP data is recorded and transit time data is derived as a function of depth and offset (i.e., lateral distance from the wellbore) throughout the area of interest in proximity of the wellbore.

Generally speaking, tomograpy refers to techniques for imaging by sections or sectioning of an object through the use of wave energy. Tomographic reconstruction (or inversion) refers the reconstruction of an image of the object by processing wave energy signals based on tomographic mathematical analysis. In one or more embodiments, the tomographic inversion performed in Element (305) is based on comparing transit time generated in Element (304) to a ray path integral (based on the acquisition geometry) of seismic wave propagation velocities derived using the initial and/or updated velocity model. In one or more embodiments, the update velocity model includes a velocity model where the seismic wave propagation velocities are represented as a function of depth and offset.

In Element (306), a low frequency model is generated based on the updated velocity model (e.g., in particular, the spatial variations of the velocity model). In one or more embodiments, a time scale in seismic data may be correlated to a distance or depth scale based on wave propagation velocity. In one or more embodiments, formation model parameters and well data (e.g., low frequency portion of the well log curve information) as functions of depth may be correlated to time scale based on wave propagation velocity. In this case, the correlations are based on the updated velocity model. In one or more embodiments, formation model parameters and well data are converted to a low frequency model for use as background information. Accordingly, VSP data are superimposed onto the low frequency model to form input data for the seismic inversion. Examples of the generation of low frequency model based on the updated velocity model and using the low frequency model in seismic inversion are described in reference to FIGS. 4.1 and 4.4 below.

In Element (307), a portion of the subterranean formation in proximity to the wellbore is identified to be the area of interest based on a pre-determined criterion. In one or more embodiments, the pre-determined criterion for identifying the portion of the subterranean formation is based on locations where both pressure (P) wave to P wave (P to P) reflectivity data and P wave to shear (S) wave (P to S) reflectivity data are available in the VSP data. Further in Element (307), the VSP data is processed to generate a depth/time dependent angle model including an incidence angle of wave propagation in the identified portion of the subterranean formation. For example, the depth/time dependent angle model includes incidence angles and/or reflection angles of acoustic and/or shear wave propagation as functions of depth and offset. As is known to those skilled in the art, the depth and time of wave propagation are correlated to each other. Therefore, the depth/time dependent angle model may be represented in the time domain. In one or more embodiments, the depth/time dependent angle model is used in deriving wavelet operators for the seismic inversion. Examples of a depth/time dependent angle model and using such a model in seismic inversion are described in reference to FIGS. 4.1 and 4.4 below.

In Element (308), an elastic model of the subterranean formation is generated by performing a seismic inversion of the VSP data using the updated velocity model. In one or more embodiments, the elastic model includes acoustic impedance, shear impedance, and/or density of the subterranean formation as functions of depth and offset in proximity to the wellbore. Examples of the elastic model and generating such a model by performing the seismic inversion are described in reference to FIGS. 4.1 and 4.4 below.

In Element (309), the elastic model and well logs of the wellbore are compared, where the elastic model intersects the wellbore, to identify a difference of formation parameters (e.g., acoustic impedance, shear impedance, and/or density). The comparison is performed as a calibration process to confirm the design of the acquisition geometry and various seismic data processing settings. Further in Element (309), the acquisition geometry is adjusted to generate adjusted acquisition geometry in response to identifying the difference.

In one or more embodiments, the acquisition geometry is adjusted to expand the portion of the subterranean formation such that both P to P and P to S amplitude and angle information exist throughout the area of interest.

In one or more embodiments, the acquisition geometry is adjusted to increase VSP data redundancy within the portion of the subterranean formation such that noise or uncertainty is reduced/minimized in the processed VSP data.

In Element (310), an expanded seismic survey is performed to obtain expanded VSP data based on the adjusted acquisition geometry. Accordingly, the elastic model is adjusted based on the expanded VSP data to minimize the difference in formation parameters between the elastic model and well logs in those locations where the elastic model and well logs intersect.

Examples of adjusting the acquisition geometry, obtaining expanded VSP data, and adjusting the elastic model are described in reference to FIGS. 4.3 and 4.4 below.

In Element (311), the operations of the oilfield are adjusted based on the elastic model. For example, drilling operations, production operations, or other field operations may be adjusted based on the formation parameters of the elastic model.

FIG. 4.1 depicts an example workflow for multicomponent seismic inversion of VSP data in accordance with one or more embodiments. The example workflow includes initial model building and seismic acquisition (415), velocity tomographic inversion (416), multicomponent data processing (417), and seismic inversion (411). One or more of these steps may be iterated to improve the seismic inversion results. For example, the results of the seismic inversion (411) (e.g., acoustic impedance (412), shear impedance (413), and/or density (414)) may be used to revise the formation model (403) and initial velocity model (404) to perform one or more tomographic inversion (416), multicomponent data processing (417), and seismic inversion (411) until the difference of results between two consecutive iterations is less than a pre defined limit.

Within the elements of initial model building and seismic acquisition (415), legacy information and data (e.g., well position, geology, vintage seismic, logs, etc) are collected to generate well data (402), a formation model (403), and an initial velocity model (404) as well as to determine an acquisition geometry (400) therefrom. For example, well data (402) may include acoustic velocity (Vp), shear velocity (Vs), and density (p) as a function of depth. The formation model (403) may be a 2D or 3D model and may include geological and geophysical parameters of formation layers, horizons, etc. as functions of depth and offset, which may be updated whenever new information becomes available (e.g. based on wireline logging prior to VSP acquisition). An example of an initial velocity model (404) is shown in FIG. 4.2 where a wellbore trajectory (421) of a deviated well is represented as a curve in the 2D view of a formation (420) with X axis being offset from the wellbore opening (423) at the surface and Y axis being depth from the surface. As shown in FIG. 4.2, velocities of seismic wave propagation in the formation (420) are represented by rendering patterns defined in the legend (425). As shown, the initial velocity model (404) is a 1D model, where velocities of seismic wave propagation are assumed to be dependent on depth only. For example, the velocity of seismic wave propagation at a particular depth of the ray path (422) from the wellbore opening (423) to a receiver location (424) within the wellbore may be used to approximate velocities at all locations at that particular depth in the formation (420). Accordingly, the initial velocity model (404) may not be accurate, at locations away from the wellbore. In other examples, the initial velocity model (404) may be empirically derived based on data from adjacent wells or data related to formation layer material compositions. In such examples, the initial velocity model (404) is an empirical estimation and may not be accurate. Further examples of an acquisition geometry (400) are described in reference to FIG. 1.2 above. Examples of VSP-seismic (401) obtained based on the acquisition geometry (400) may include amplitude data of P to P wave reflection (PP), P to S wave reflection (PS), and ratio data of acoustic velocity (Vp) to shear velocity (Vs) as functions of depth and offset.

Further within the initial model building and seismic acquisition (415), synthetic data is test processed and inverted following a simplified version of the workflow (e.g., without tomographic inversion (416) and depth/time dependent angle model (406)) to reproduce, wherever applicable, the initial data (e.g., well data (402), formation model (403), and initial velocity model (404)) within a certain tolerance. Accordingly, the workflow is preliminarily validated prior to performing the full version of seismic inversion of VSP data.

Within the elements of velocity tomographic inversion (416), acquisition geometry (400) and initial velocity model (404) are determined/generated from the initial model building and seismic acquisition (415) while transit time data (405) (for both acoustic wave propagation and shear wave propagation) is derived from the VSP-seismic (401) as described in reference to FIG. 1.2 above. Based on mathematical analysis known to those skilled in the art, the initial velocity model (404) is modified to generate the updated velocity model (410) based on the acquisition geometry (400) and the transit time data (405). In such mathematical analysis, the transit time data (405) represents a 2D or 3D ray path integral of seismic wave propagation velocity over the area of interest swept/covered during VSP acquisition. The mathematical analysis then recursively computes seismic waveform routes and the seismic wave propagation velocities along such routes using intermediate transit time data and source/receiver locations of the acquisition geometry (400). Accordingly, the updated velocity model is a 2D or 3D model and has improved accuracy at locations away from the wellbore.

Within the elements of multicomponent data processing (417), the updated velocity model (410) is used to generate the low frequency model (409) that is used as a background model to supplement the VSP-seismic (401), which typically do not include low frequency information (e.g., <5 Hz). For example, the low frequency model (409) represents parameters on a time scale and may include information from the formation model (403) that is converted from a distance scale to the time scale using the updated velocity model (410). Further, the well data (402) may also be converted to be based on the time scale using the updated velocity model (410) to perform log calibration (408). Specifically, the log calibration (408) may calibrate or adjust the low frequency model (409) based on a comparison of information contained in the well data (402) (i.e., in the form of data log along the wellbore) against information contained in the low frequency model (409) (i.e., in the form of 2D or 3D function in proximity to the wellbore in the formation) where the two models intersect at the wellbore. For example, the information to be compared may include reflectivity as a function of incidence angle (r(θ)). In addition, the updated velocity model (410) may also be used throughout the workflow as parameter input wherever applicable such as wavefield separation, normal moveout estimation, spherical divergence compensation, imaging, etc.

Further within the elements of multicomponent data processing (417), a depth/time dependent angle model (406) is derived from VSP-seismic (401) and is used in generating the wavelet operators (407) (i.e., mathematical operators used in the seismic inversion (411)) in conjunction with the VSP-seismic (401). For example, the depth/time dependent angle model (406) may include incidence and reflection angles of PP reflection and PS reflection as a function θ(TWT) of TWT (i.e., two way transit time defined as the time taken for a seismic wave to propagate from the source at the surface to a subsurface formation layer boundary and then return to the surface). In particular, the VSP-seismic (401) and depth/time dependent angle model (406) include information as 2D or 3D functions of depth and offset in proximity to the wellbore. Accordingly, the wavelet operators (407) have improved accuracy at locations away from the wellbore. As noted above, the well data (402) may be converted to be based on the time scale using the updated velocity model (410), which may be compared against the wavelet operators (407) at the wellbore to perform the log calibration (408), which calibrates or adjusts the wavelet operators (407) based on the well data (402). Further, upgoing wavefield and well logs are combined as input (e.g., time variant) to estimate wavelet operators for the seismic inversion where anelastic effects on the wavefield and Q factor are estimated and compensated for. Specifically, Q factor is the ratio of the peak energy of a wave to the dissipated energy. As waves travel, they lose energy with distance and time due to spherical divergence and absorption. Such energy loss must be accounted for when restoring seismic amplitudes to perform fluid and lithologic interpretations, such as amplitude versus offset (AVO) analysis. It is important to estimate and compensate for the Q factory as it has been demonstrated that inadequate or no Q factor compensation can produce misleading elastic inversion results.

The seismic inversion (411) is then performed on mapped amplitude data for PP reflection and PS reflection, their respective angles of incidence, and the ratio data of Vp/Vs for PS reflection that is mapped in the same domain (i.e., a range in proximity to the wellbore) as the amplitude data. As shown in FIG. 4.1, the seismic inversion (411) is based on the wavelet operators (407) derived using the depth/time dependent angle model (406) and the low frequency model (409), which is generated using the update velocity model (410). While a typical seismic inversion of VSP data is only capable of generating acoustic impedance information, shear impedance (413) and density (414) are also generated by the seismic inversion (411), in addition to acoustic impedance (412), based on 2D or 3D information provided by the depth/time dependent angle model (406). Specifically, shear impedance (413) and density (414) are generated over the domain where the shear image (i.e., data related to the PS reflection) exists, which is typically a subset of the domain where the acoustic image (i.e., data related to the PP reflection) exists.

FIG. 4.3 depicts example processed VSP data for multicomponent seismic inversion of VSP data in accordance with one or more embodiments. FIG. 4.3 is drawn on four sheets as FIGS. 4.3.1-4.4.4 for clarity. As shown, the processed VSP data includes a PP reflection amplitude image (431), a PS reflection amplitude image (432), a PP incidence angle image (433), and a PS incidence angle image (434). The amplitude and incidence angle values (specifically, the trigonometric SINE function of the incidence angle) are represented by rendering patterns defined in the legend (436). These four images are shown as 2D plots with the X axis representing CDP (i.e., common depth point, which is related to the offset) and the Y axis representing a depth along a converted TWT time scale. Within the four images, the point where TWT=0 and CDP=1 corresponds to the seismic source at the surface while a range (435) is identified corresponding to an area of interest in proximity of the wellbore, where the area of interest corresponds to a depth range equivalent to 1.0 to 1.7 on the converted TWT scale and 15-63 on the CDP scale. As shown in FIG. 4.3, both PP and PS reflection amplitude and incidence angle information exists except for within a corner portion (435-1) of the identified range (435). As noted above, the multicomponent seismic inversion of VSP data may be performed throughout the identified range (435) with the exception of the corner portion (435-1). Correspondingly, results of the multicomponent seismic inversion of VSP data may be generated throughout majority of the area of interest in proximity to the wellbore.

FIG. 4.4 depicts example results for multicomponent seismic inversion of VSP data in accordance with one or more embodiments. FIG. 4.4 is drawn on three sheets as FIGS. 4.4.1-4.4.3 for clarity. As shown, the example results includes an acoustic impedance model (441), a shear impedance model (442), and a density model (443) as a portion of an elastic model that are generated by performing the multicomponent seismic inversion of the VSP data shown in FIG. 4.3 above. The elastic model is shown to cover a depth range equivalent to 1.0 to 1.7 on the converted TWT scale and 15-63 on the CDP scale consistent with the area of interest described in FIG. 4.3 above. Values of the acoustic impedance, shear impedance, and density are represented by rendering patterns defined by the legend (445). The formation layers in proximity of the wellbore are flat, and parallel horizontal layers as correctly reflected in the three models (441, 442, 443) as having offset independent elastic parameters. Accordingly, the 2D plots of the three models (441, 442, 443) are also plotted as traces each consisting of a well log curve, an inversion result curve, and a low frequency model curve identified based on the legend (445). The enclosed region (441-2) of the three 2D plots represents the wellbore located at CDP=21. The elastic parameters within the enclosed region (441-2) exhibit higher resolution corresponding to initially collected higher frequency information from the well data (402) (i.e., the well log curves) in comparison to the lower resolution/frequency information outside the enclosed region (441-2), where the inversion result curves are determined primarily based on the VSP-seismic (401) superimposed over the low frequency model curves. The apparent agreement between the well log curves and the inversion result curves indicate the high quality of the multicomponent seismic inversion of VSP data.

Further as shown in FIG. 4.4, a portion (441-1) of the range covered by the elastic model corresponds to the area of interest described in reference to FIG. 4.3 above. Specifically, the corner portion (435-1 of FIG. 4.3) where shear image data is missing corresponds to the corner portion (443-1) in the three models (441, 442, 443) where elastic parameters are missing. As discussed above in reference to Element (309) of FIG. 3, the acquisition geometry (400 of FIG. 4.1) may be adjusted and VSP-seismic (401 of FIG. 4.1) may be expanded/supplemented by an expanded seismic survey based on the adjusted acquisition geometry (400 of FIG. 4.1) to eliminate/minimize the corner portion (435-1 of FIG. 4.3) and (441-1) such that both P to P and P to S amplitude and angle information exist throughout the area of interest.

Figure 5:
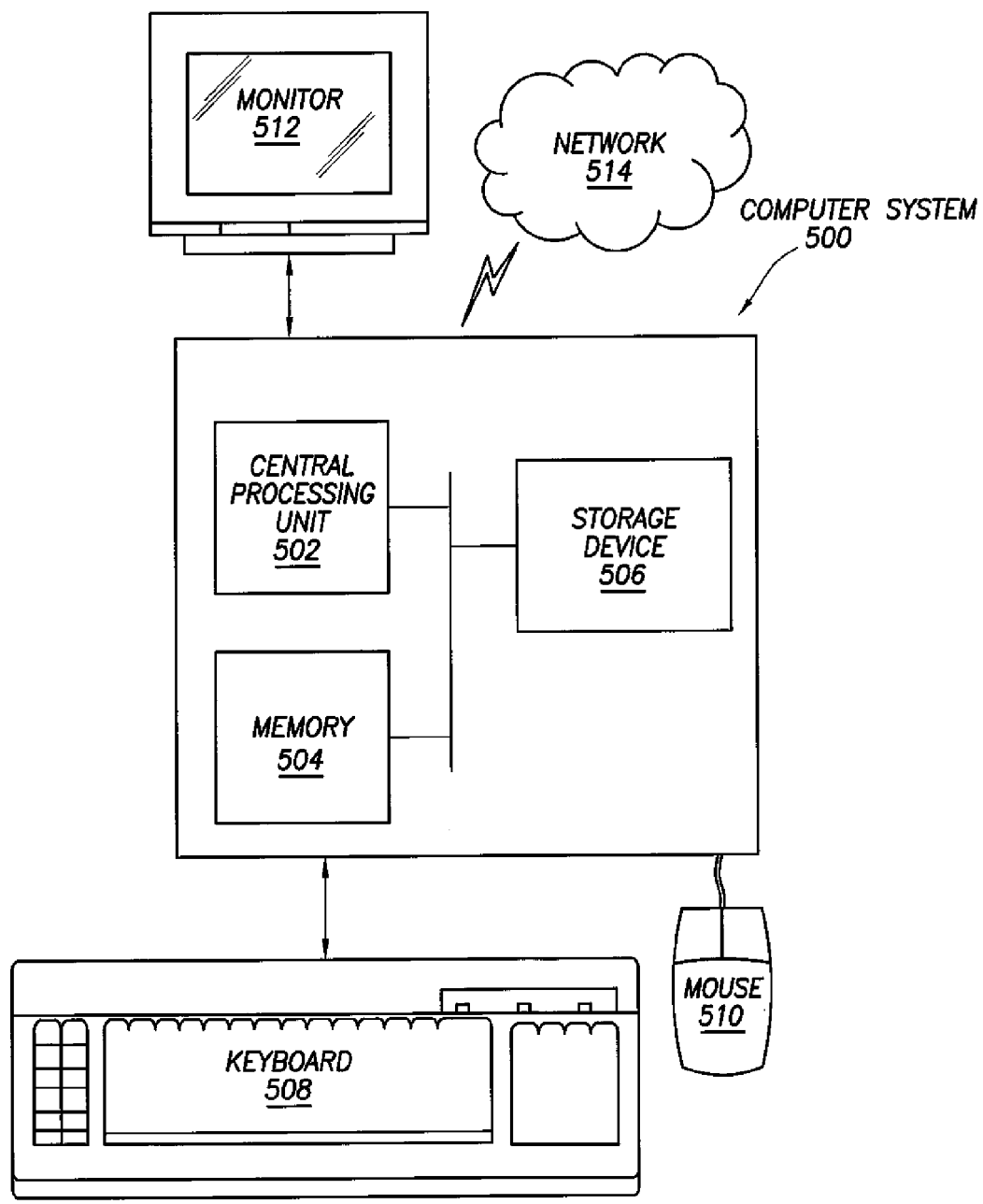
FIG. 5 depicts a computer system in which one or more embodiments of multicomponent seismic inversion of VSP data may be implemented.

Embodiments of multicomponent seismic inversion of VSP data may be implemented on virtually any type of computer regardless of the platform being used. For instance, as shown in FIG. 5, a computer system (500) includes one or more processor(s) (502) such as a central processing unit (CPU) or other hardware processor, associated memory (504) (e.g., random access memory (RAM), cache memory, flash memory, etc.), a storage device (506) (e.g., a hard disk, an optical drive such as a compact disk drive or digital video disk (DVD) drive, a flash memory stick, etc.), and numerous other elements and functionalities typical of today's computers (not shown). The computer (500) may also include input means, such as a keyboard (508), a mouse (510), or a microphone (not shown). Further, the computer (500) may include output means, such as a monitor (512) (e.g., a liquid crystal display LCD, a plasma display, or cathode ray tube (CRT) monitor). The computer system (500) may be connected to a network (514) (e.g., a local area network (LAN), a wide area network (WAN) such as the Internet, or any other similar type of network) via a network interface connection (not shown). Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means may take other forms, now known or later developed. Generally speaking, the computer system (500) includes at least the minimal processing, input, and/or output means necessary to practice one or more embodiments.

Further, those skilled in the art will appreciate that one or more elements of the aforementioned computer system (500) may be located at a remote location and connected to the other elements over a network. Further, one or more embodiments may be implemented on a distributed system having a plurality of nodes, where each portion of the implementation (e.g., the direction tool, the servers) may be located on a different node within the distributed system. In one or more embodiments, the node corresponds to a computer system. Alternatively, the node may correspond to a processor with associated physical memory. The node may alternatively correspond to a processor with shared memory and/or resources. Further, software instructions to perform one or more embodiments may be stored on a computer readable medium such as a compact disc (CD), a diskette, a tape, or any other computer readable storage device.

The systems and methods provided relate to the acquisition of hydrocarbons from an oilfield. It will be appreciated that the same systems and methods may be used for performing subsurface operations, such as mining, water retrieval and acquisition of other underground fluids or other geomaterials from other fields. Further, portions of the systems and methods may be implemented as software, hardware, firmware, or combinations thereof.

While multicomponent seismic inversion of VSP data has been described with respect to a limited number of embodiments, those skilled in the art, having benefit of this disclosure, will appreciate that other embodiments may be devised which do not depart from the scope of multicomponent seismic inversion of VSP data as disclosed herein. For example, while FIG. 1.2 depicts a particular VSP acquisition configuration, other VSP configurations (e.g., zero-offset VSP, offset VSP, walkaway VSP, multi-azimuthal walkaway VSP, 3D VSP, walk-above VSP, salt-proximity VSP, shear-wave VSP, and drill-noise or seismic-while-drilling VSP, etc.) may also be used. Accordingly, the scope of multicomponent seismic inversion of VSP data should be limited only by the attached claims.

What is claimed is:

1. A method for seismic inversion of vertical seismic profile (VSP) data in an oilfield having a subterranean formation penetrated by a wellbore, comprising:
    obtaining an initial velocity model of the subterranean formation, the initial velocity model comprising acoustic velocities of wave propagation in proximity to the wellbore;
    determining an acquisition geometry for obtaining the VSP data, the acquisition geometry comprising a plurality of receiver locations within the wellbore and a source location;
    performing a seismic survey to obtain the VSP data based on the acquisition geometry;
    analyzing, using a central processing unit (CPU) of a computer system, direct arrival signals of the VSP data to generate transit time data for wave propagation from the source location to the plurality of receiver locations;
    modifying, using the CPU, the initial velocity model to generate an updated velocity model by performing a tomographic inversion of the transit time data;
    generating, using the CPU, an elastic model of the subterranean formation by performing the seismic inversion of the VSP data using the updated velocity model; and
    adjusting the operations of the oilfield based on the elastic model.

2. The method of claim 1, wherein the updated velocity model comprises a two dimensional velocity model.

3. The method of claim 1, wherein the elastic model comprises at least one selected from a group consisting of acoustic impedance, shear impedance, and density of the subterranean formation in proximity to the wellbore.

4. The method of claim 1, further comprises:
    generating a low frequency model based on the updated velocity model,
    wherein performing the seismic inversion of the VSP data further uses the low frequency model.

5. The method of claim 1, further comprises:
    identifying a portion of the subterranean formation in proximity to the wellbore based on a pre-determined criterion; and
    processing the VSP data to generate a depth/time dependent angle model comprising an incidence angle of wave propagation in the portion of the subterranean formation,
    wherein performing the seismic inversion of the VSP data further uses the depth/time dependent angle model.

6. The method of claim 5, further comprising:
    processing the VSP data to generate pressure (P) wave to P wave reflectivity data and P wave to shear (S) wave reflectivity data,
    wherein the portion of the subterranean formation is identified where both the P wave to P wave reflectivity data and the S wave to S wave reflectivity data are available.

7. The method of claim 5, further comprising:
    comparing, where the elastic model intersects the wellbore, the elastic model and well logs of the wellbore to identify a difference of formation parameters;
    adjusting the acquisition geometry to generate an adjusted acquisition geometry in response to identifying the difference, wherein the acquisition geometry is adjusted for at least one selected from a group consisting of expanding the portion of the subterranean formation and increasing VSP data redundancy within the portion of the subterranean formation;
    performing an expanded seismic survey to obtain expanded VSP data based on the adjusted acquisition geometry; and
    adjusting the elastic model based on the expanded VSP data to minimize the difference.

8. A system for seismic inversion of vertical seismic profile (VSP) data in an oilfield having a subterranean formation penetrated by a wellbore therein, the system comprising:
    a seismic wave source device configured to perform a seismic survey;
    a plurality of receivers disposed inside the wellbore and configured to obtain the VSP data during the seismic survey;
    a VSP data inversion tool configured to:
        identify a portion of the subterranean formation in proximity to the wellbore based on a pre-determined criterion;
        process the VSP data to generate a depth/time dependent angle model comprising an incidence angle of wave propagation in the portion of the subterranean formation; and
        perform the seismic inversion of the VSP data using the depth/time dependent angle model to generate an elastic model of the subterranean formation; and
    a surface unit comprising a controller configured to adjust the operations of the oilfield based on the elastic model.

9. The system of claim 8, wherein the elastic model comprises at least one selected from a group consisting of acoustic impedance, shear impedance, and density of the subterranean formation in proximity to the wellbore.

10. The system of claim 8, wherein the VSP data inversion tool is further configured to:
   process the VSP data to generate pressure (P) wave to P wave reflectivity data and P wave to shear (S) wave reflectivity data,
   wherein the portion of the subterranean formation is identified where both the P wave to P wave reflectivity data and the S wave to S wave reflectivity data are available.

11. The system of claim 8, wherein the VSP data inversion tool is further configured to:
   obtain an initial velocity model of the subterranean formation, the initial velocity model comprising acoustic velocities of wave propagation in proximity to the wellbore;
   determine an acquisition geometry comprising locations of the seismic source and the plurality of receivers;
   analyze direct arrival signals of the VSP data to generate transit time data for wave propagation from a location of the seismic source to locations to the plurality of receivers;
   modify the initial velocity model to generate an updated velocity model by performing tomographic inversion of the transit time data; and
   perform the seismic inversion of the VSP data further based on the updated velocity model to generate the elastic model of the subterranean formation.

12. The system of claim 11, wherein the updated velocity model comprises a two dimensional velocity model.

13. The system of claim 11, wherein the VSP data inversion tool is further configured to:
   generate a low frequency model based on the updated velocity model,
   wherein performing the seismic inversion of the VSP data further uses the depth/time dependent angle model.

14. The system of claim 11, wherein the VSP data inversion tool is further configured to:
   compare, where the elastic model intersects the wellbore, the elastic model and well log of the wellbore to identify a difference of formation parameters; and
   adjust the acquisition geometry to generate an adjusted acquisition geometry in response to identifying the difference, wherein the acquisition geometry is adjusted for at least one selected from a group consisting of expanding the portion of the subterranean formation and increasing VSP data redundancy within the portion of the subterranean formation;
   perform expanded seismic survey to obtain expanded VSP data based on the adjusted acquisition geometry; and
   adjust the elastic model based on the expanded VSP data to minimize the difference.

15. A computer readable medium storing instructions for seismic inversion of vertical seismic profile (VSP) data in an oilfield having a subterranean formation penetrated by a wellbore, the instructions when executed causing a processor to:
   obtain an initial velocity model of the subterranean formation, the initial velocity model comprising acoustic velocities of wave propagation in proximity to the wellbore;
   determine an acquisition geometry for obtaining the VSP data, the acquisition geometry comprising a plurality of receiver locations within the wellbore and a source location;
   perform a seismic survey to obtain the VSP data based on the acquisition geometry;
   analyze, using a central processing unit (CPU) of a computer system, direct arrival signals of the VSP data to generate transit time data for wave propagation from the source location to the plurality of receiver locations;
   modify, using the CPU, the initial velocity model to generate an updated velocity model by performing a tomographic inversion of the transit time data;
   generate, using the CPU, an elastic model of the subterranean formation by performing the seismic inversion of the VSP data using the updated velocity model; and
   adjust the operations of the oilfield based on the elastic model.

16. The computer readable medium of claim 15,
   wherein the updated velocity model comprises a two dimensional velocity model, and
   wherein the elastic model comprises at least one selected from a group consisting of acoustic impedance, shear impedance, and density of the subterranean formation in proximity to the wellbore.

17. The computer readable medium of claim 15, the instructions when executed further causing the processor to:
   generate a low frequency model based on the updated velocity model,
   wherein performing the seismic inversion of the VSP data further uses the low frequency model.

18. The computer readable medium of claim 15, the instructions when executed further causing the processor to:
   identify a portion of the subterranean formation in proximity to the wellbore based on a pre-determined criterion; and
   process the VSP data to generate a depth/time dependent angle model comprising an incidence angle of wave propagation in the portion of the subterranean formation,
   wherein performing the seismic inversion of the VSP data further uses the depth/time dependent angle model.

19. The computer readable medium of claim 18, the instructions when executed further causing the processor to:
   process the VSP data to generate pressure (P) wave to P wave reflectivity data and P wave to shear (S) wave reflectivity data,
   wherein the portion of the subterranean formation is identified where both the P wave to P wave reflectivity data and the S wave to S wave reflectivity data are available.

20. The computer readable medium of claim 18, the instructions when executed further causing the processor to:
   compare, where the elastic model intersects the wellbore, the elastic model and well logs of the wellbore to identify a difference of formation parameters;
   adjust the acquisition geometry to generate an adjusted acquisition geometry in response to identifying the difference, wherein the acquisition geometry is adjusted for at least one selected from a group consisting of expanding the portion of the subterranean formation and increasing VSP data redundancy within the portion of the subterranean formation;
   perform an expanded seismic survey to obtain expanded VSP data based on the adjusted acquisition geometry; and
   adjust the elastic model based on the expanded VSP data to minimize the difference.

* * * * *